US012405288B2

(12) United States Patent
Kozacik et al.

(10) Patent No.: US 12,405,288 B2
(45) Date of Patent: Sep. 2, 2025

(54) WIND DETERMINATION METHOD, WIND DETERMINATION SYSTEM, AND WIND DETERMINATION COMPUTER PROGRAM PRODUCT FOR DETERMINING WIND SPEED AND DIRECTION BASED ON IMAGE ANALYSIS

(71) Applicant: EM Photonics, Inc., Newark, DE (US)

(72) Inventors: Stephen Kozacik, Bloomfield, NJ (US); Aaron Paolini, Wilmington, DE (US); Eric Kelmelis, Lincoln University, PA (US)

(73) Assignee: EM Photonics, Newark, DE (US)

( * ) Notice: Subject to any disclaimer, the term of this patent is extended or adjusted under 35 U.S.C. 154(b) by 872 days.

(21) Appl. No.: 17/201,851

(22) Filed: Mar. 15, 2021

(65) Prior Publication Data
US 2021/0356492 A1 Nov. 18, 2021

Related U.S. Application Data

(60) Provisional application No. 63/025,292, filed on May 15, 2020.

(51) Int. Cl.
*G01P 5/26* (2006.01)
*G01S 17/58* (2006.01)

(52) U.S. Cl.
CPC ............... *G01P 5/26* (2013.01); *G01S 17/58* (2013.01); *G06T 2207/30212* (2013.01); *G06T 2207/30232* (2013.01)

(58) Field of Classification Search
CPC .... G01P 5/26; G01P 3/38; G01P 13/02; G01P 21/025; G01S 17/58; G06T 2207/30212; G06T 2207/30232
See application file for complete search history.

(56) References Cited

U.S. PATENT DOCUMENTS

| 7,245,742 B2 | 7/2007 | Carrano et al. |
| 8,300,968 B2 | 10/2012 | Ortiz et al. |
| 8,340,456 B1 * | 12/2012 | DaneshPanah ......... G06T 7/571 |
| | | 348/207.99 |
| 9,074,847 B1 * | 7/2015 | Sullivan .................... F41G 5/16 |
| 2016/0182866 A1 * | 6/2016 | Landqvist .............. H04N 23/60 |
| | | 348/143 |

(Continued)

OTHER PUBLICATIONS

Intelligent Rail®, I-Rail® Technology Platform Features, published by T-Worx, available at https://tworx.com/intelligentrail/, retrieved Mar. 2, 2021.

(Continued)

*Primary Examiner* — Nancy Bitar
*Assistant Examiner* — Dustin Bilodeau
(74) *Attorney, Agent, or Firm* — Muir Patent Law, PLLC

(57) ABSTRACT

An apparatus for determining wind speed includes an image capture device, a memory, and a computer-readable medium. The image capture device captures video and the memory stores the video. The computer-readable medium includes a computer program product stored thereon, and the computer program product is configured to determine a wind speed in the scene based on analysis of atmospheric turbulence occurring in the video. The method may include comparing a set of models to an analyzed video to determine the wind speed.

22 Claims, 18 Drawing Sheets

(56) References Cited

U.S. PATENT DOCUMENTS

2018/0150948 A1* 5/2018 Yamamoto .............. G06T 11/60
2020/0410645 A1* 12/2020 Higaki ...................... G06T 5/70

OTHER PUBLICATIONS

Rail Operating System (ROS), published by T-Worx, available at https://tworx.com/rail-operating-system-ros, retrieved Mar. 2, 2021.
Intel® Movidius™ Myriad™ X Vision Processing Unit (VPU) 204770, published by Intel Corporation, available at https://www.intel.com/content/www/us/en/products/processors/movidius-vpu/movidius-myriad-x.html, retrieved Mar. 8, 2021.
"Product Brief, Intel® Movidius™ Myriad™ X VPU, Enhanced Visual Intelligence at the Network Edge," Movidius, an Intel Company, 2018.
S. E. J. Shaw and E. M. Tomlinson, "Analytic propagation variances and power spectral densities from a wave-optics perspective," J. Opt. Soc. Am. A, vol. 36, No. 7, pp. 1267-1278, Jul. 2019.
S.R. Bose-Pillai et al., "Estimation of atmospheric turbulence using differential motion of extended features in time-lapse imagery," Opt. Eng., vol. 57, No. 10, pp. 104108-1-104108-12, 2018.
E. Kelmelis, S. Kozacik, and A. Paolini, "Practical considerations for real-time turbulence mitigation in long-range imagery," Opt. Eng., vol. 56, No. 7, pp. 071506-1-071506-12, Jul. 2017.
C.J. Carrano, "Speckle imaging over horizontal paths," in International Symposium on Optical Science and Technology, pp. 109-120, Jul. 8, 2002.
G. Farnebäck, "Two-frame Motion Estimation Based on Polynomial Expansion," Scandinavian Conference on Image Analysis, Springer, Berlin, Heidelberg, Jun. 24, 2003.
T. Kroeger et al., "Fast Optical Flow Using Dense Inversion Search," European Conference on Computer Vision, Springer, Cham, 2016.
C. Zach, T. Pock, and H. Bischof, "A Duality Based Approach for Realtime TV-L1 Optical Flow," DAGM 2007, LNCS 4713, pp. 214-223, 2007.
J. Sánchez Pérez, E. Meinhardt-Llopis, and G. Facciolo, "TV-L1 Optical Flow Estimation," Image Processing On Line, pp. 137-150, Jul. 19, 2013.
S. Gladysz, "Absolute and differential G-tilt in turbulence: theory and applications," Optics in Atmospheric Propagation and Adaptive Systems XIX, vol. 10002, pp. 100020F-1-100020F-9, Nov. 1, 2016.
T. A. Underwood and D. G. Voelz, "Wave optics approach for incoherent imaging simulation through distributed turbulence," in Unconventional Imaging and Wavefront Sensing 2013, vol. 8877, p. 88770G-1-88770G-8, Sep. 17, 2013.
D. L. Fried and T. Clark, "Extruding Kolmogorov-type phase screen ribbons," J. Opt. Soc. Am. A, vol. 25, No. 2, p. 463-468, Feb. 2008.

* cited by examiner

FIG. 2 – Determine Wind Speed
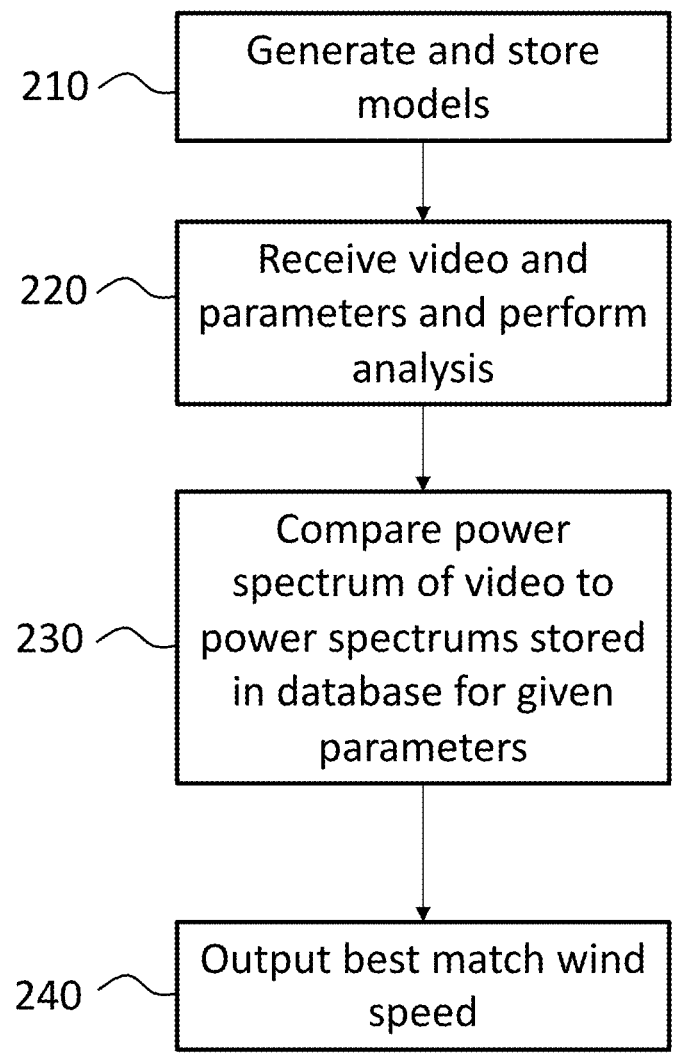

FIG. 3A – Generate Models
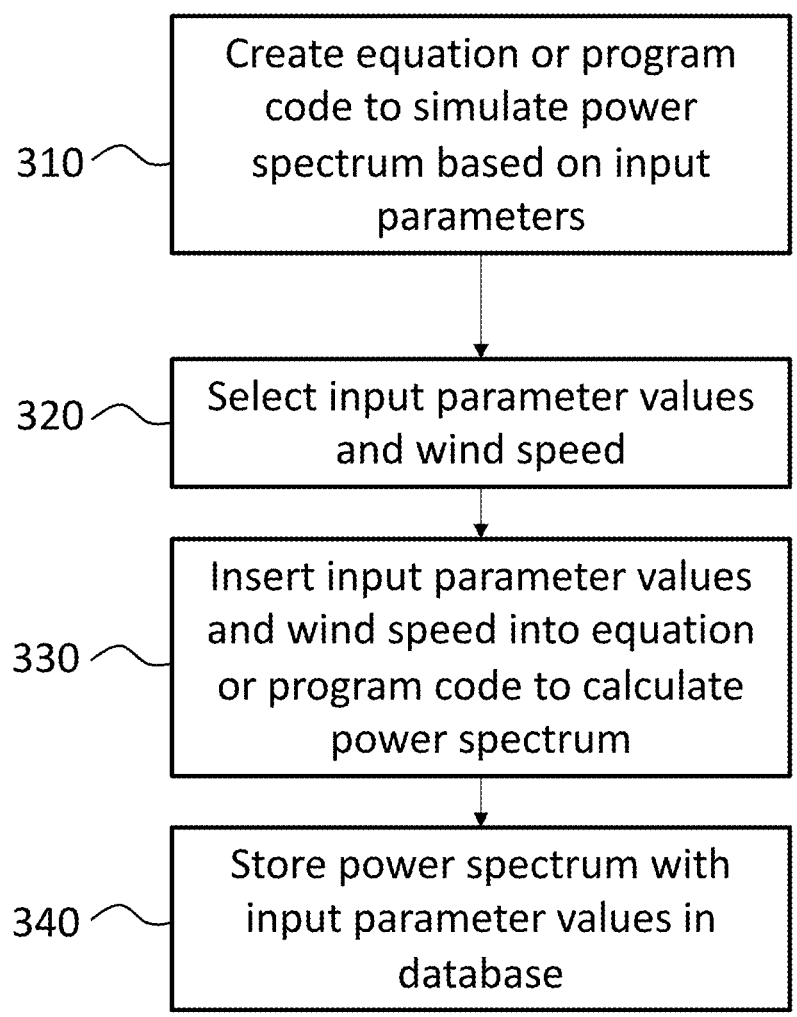

FIG. 3B
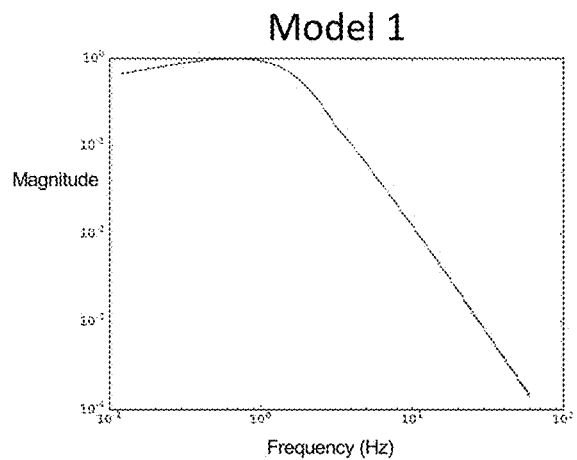
Model 1
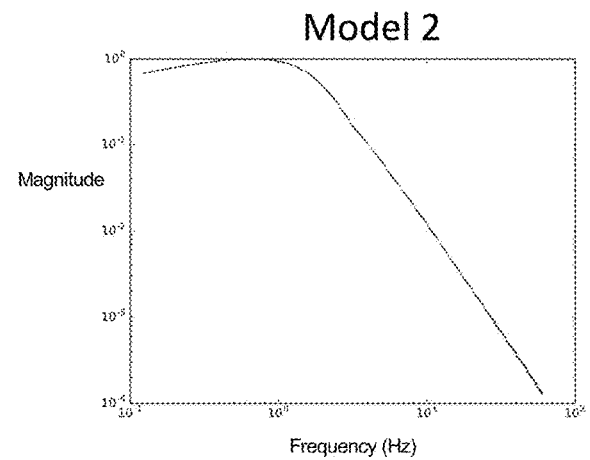
Model 2
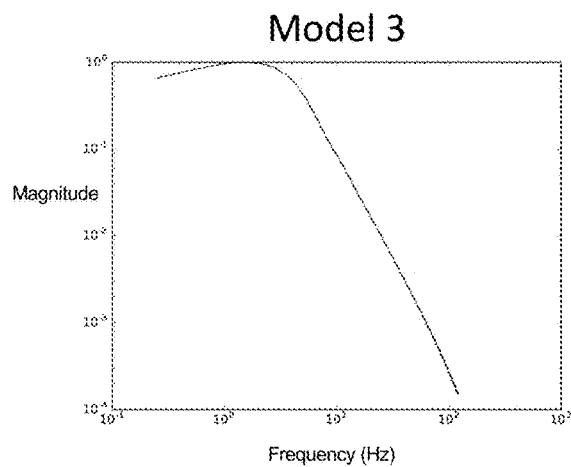
Model 3
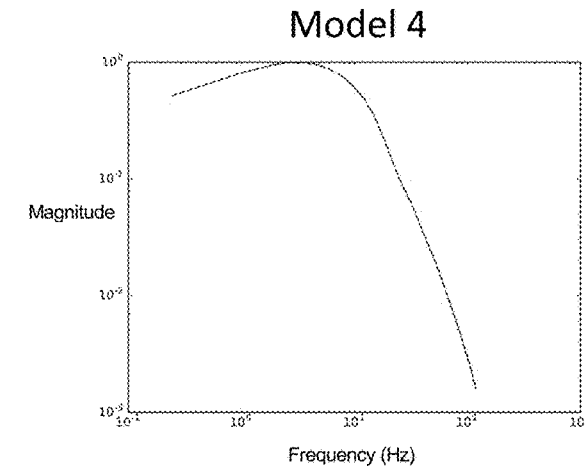
Model 4
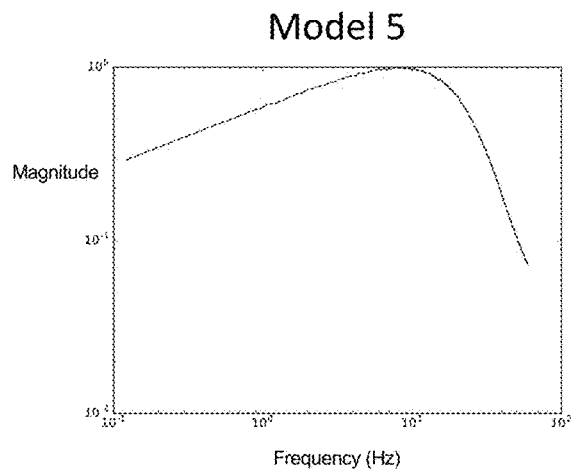
Model 5
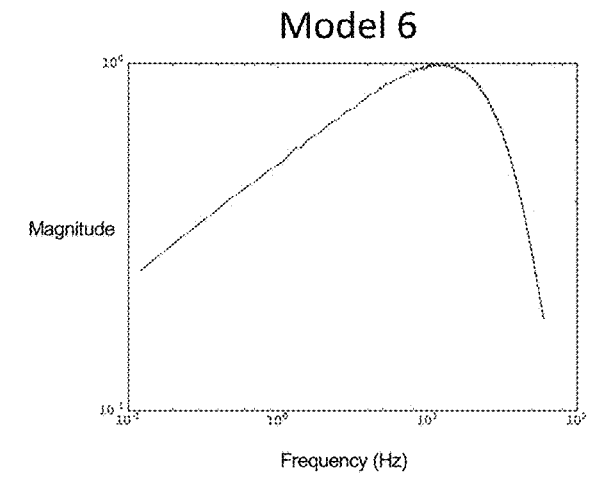
Model 6

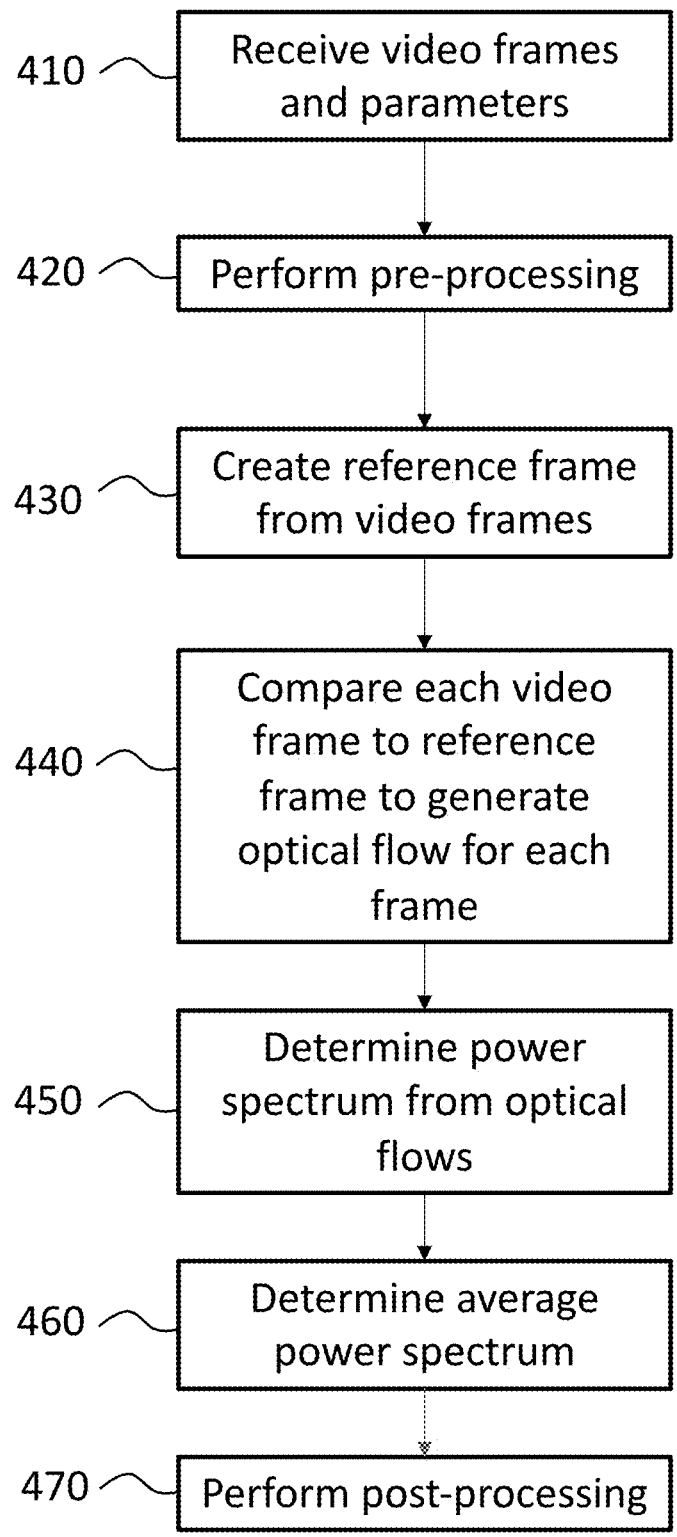
FIG. 4A – Analyze Video

FIG. 4B – Example Optical Flow
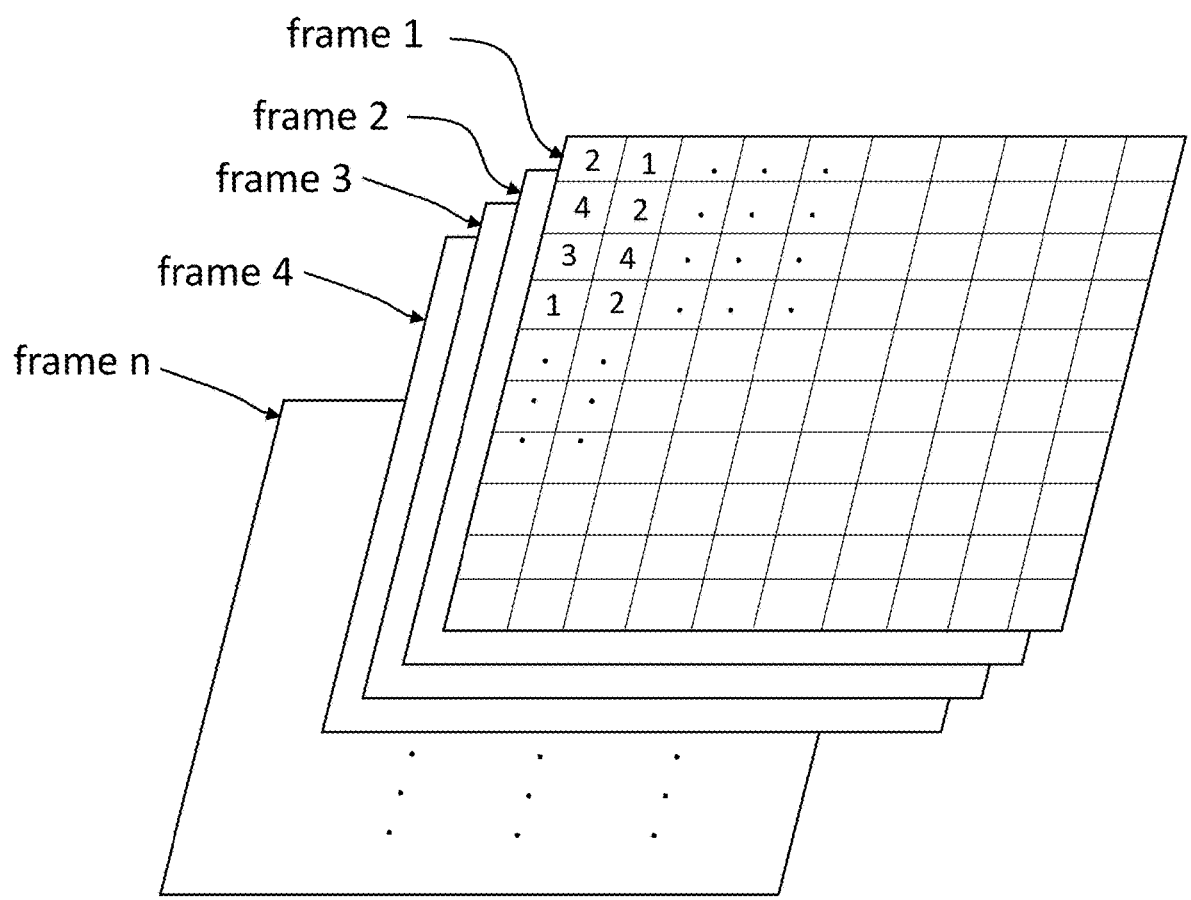

FIG. 5 – Determine Wind Direction
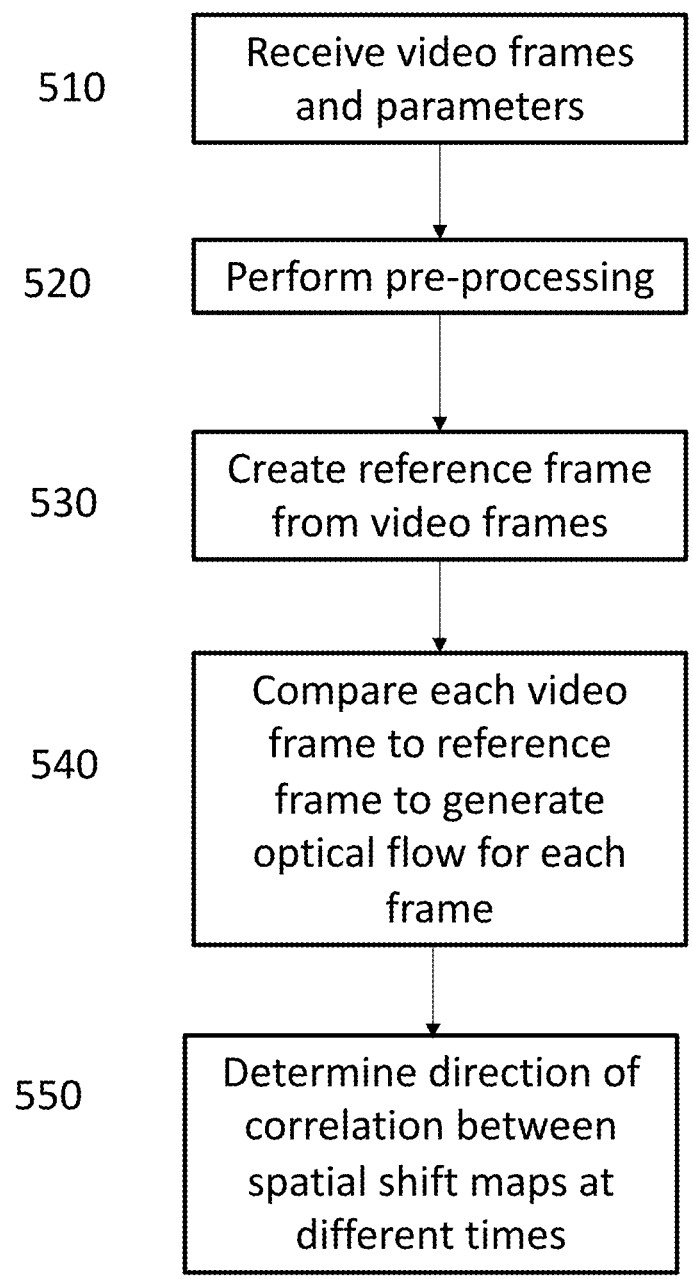

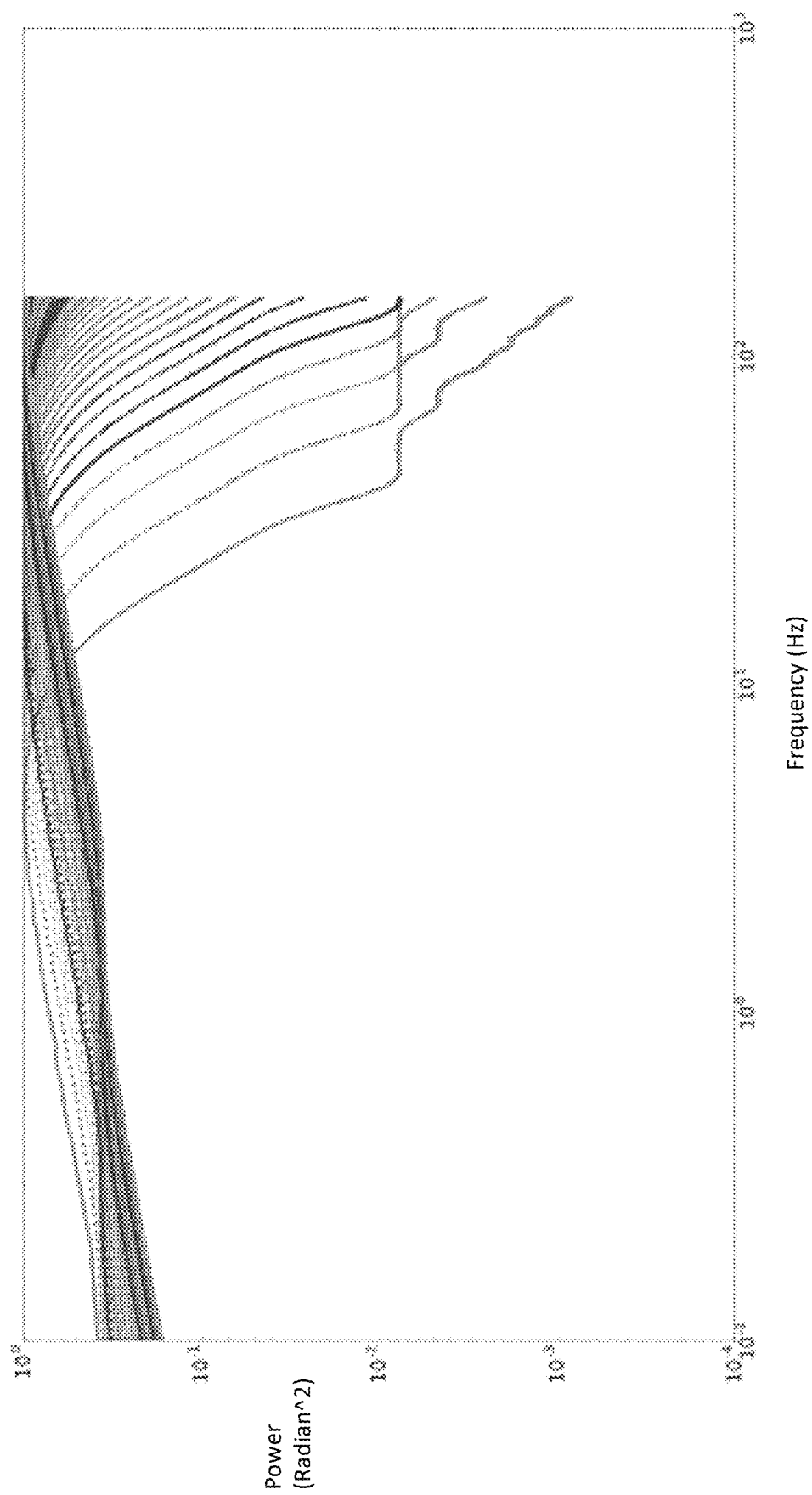

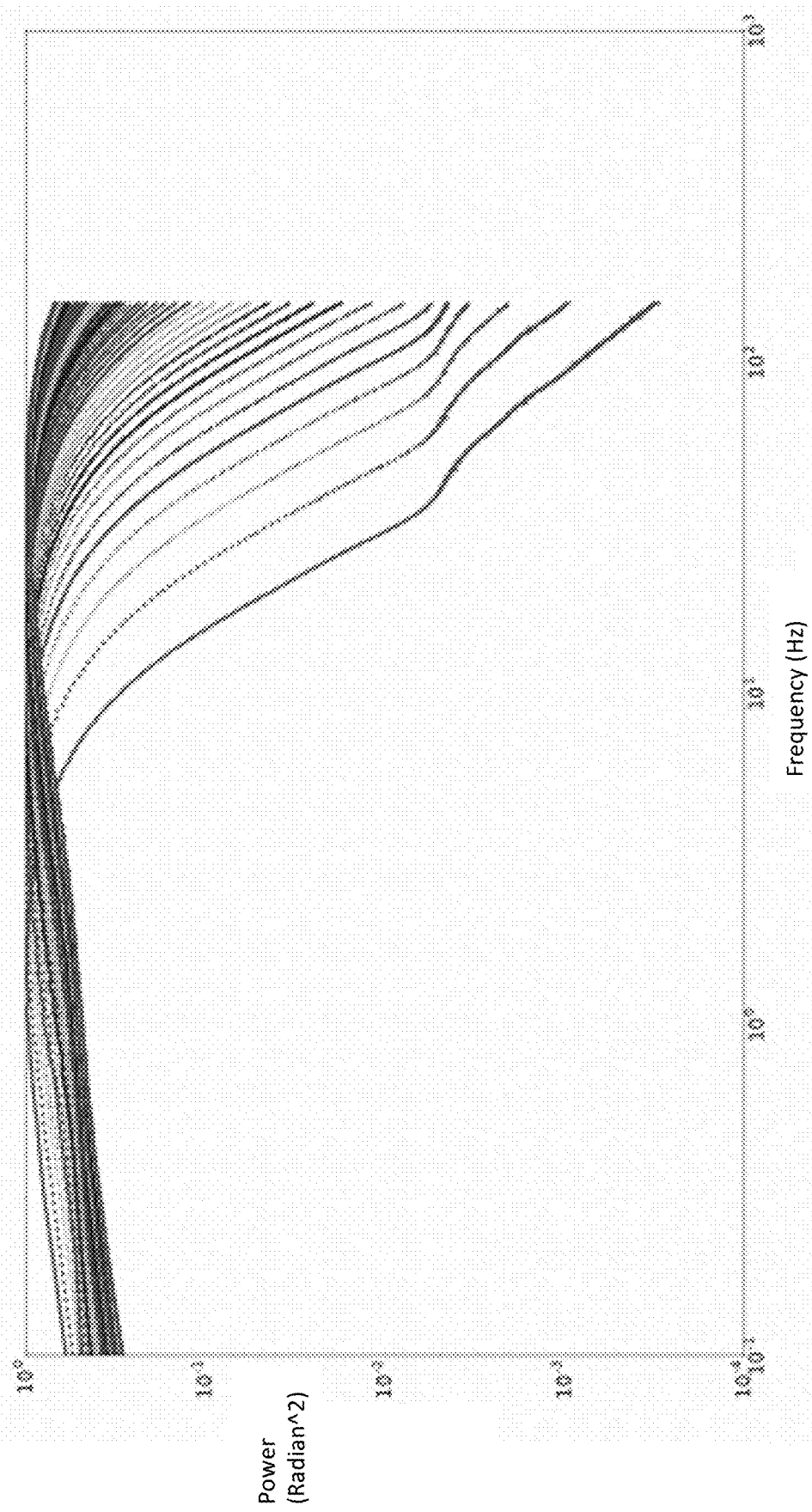

FIG. 8C

| | | | |
|---|---|---|---|
| ─── | v = 0.5 | ─── | v = 7.60204081633 |
| ···· | v = 0.795918367347 | ···· | v = 7.89795918367 |
| ······ | v = 1.09183673469 | ······ | v = 8.19387755102 |
| ·−·−· | v = 1.38775510204 | ·−·−· | v = 8.48979591837 |
| ─── | v = 1.68367346939 | ─── | v = 8.78571428571 |
| ···· | v = 1.97959183673 | ···· | v = 9.08163265306 |
| ······ | v = 2.27551020408 | ······ | v = 9.37755102041 |
| ·−·−· | v = 2.57142857143 | ·−·−· | v = 9.67346938776 |
| ─── | v = 2.86734693878 | ─── | v = 9.9693877551 |
| ···· | v = 3.16326530612 | ···· | v = 10.2653061224 |
| ······ | v = 3.45918367347 | ······ | v = 10.5612244898 |
| ·−·−· | v = 3.75510204082 | ·−·−· | v = 10.8571428571 |
| ─── | v = 4.05102040816 | ─── | v = 11.1530612245 |
| ···· | v = 4.34693877551 | ···· | v = 11.4489795918 |
| ······ | v = 4.64285714286 | ······ | v = 11.7448979592 |
| ·−·−· | v = 4.9387755102 | ·−·−· | v = 12.0408163265 |
| ─── | v = 5.23469387755 | ─── | v = 12.3367346939 |
| ···· | v = 5.5306122449 | ···· | v = 12.6326530612 |
| ······ | v = 5.82653061224 | ······ | v = 12.9285714286 |
| ·−·−· | v = 6.12244897959 | ·−·−· | v = 13.2244897959 |
| ─── | v = 6.41836734694 | ─── | v = 13.5204081633 |
| ···· | v = 6.71428571429 | ···· | v = 13.8163265306 |
| ······ | v = 7.01020408163 | ······ | v = 14.112244898 |
| ·−·−· | v = 7.30612244898 | ·−·−· | v = 14.4081632653 |
| | | ─── | v = 14.7040816327 |
| | | ···· | v = 15.0 | ns

WIND DETERMINATION METHOD, WIND DETERMINATION SYSTEM, AND WIND DETERMINATION COMPUTER PROGRAM PRODUCT FOR DETERMINING WIND SPEED AND DIRECTION BASED ON IMAGE ANALYSIS

PRIOR APPLICATIONS

This Application claims priority to U.S. Provisional Patent Application No. 63/025,292, filed May 15, 2020, which is incorporated by reference herein in its entirety.

GOVERNMENT LICENSE RIGHTS

This invention was made with government support under Government Contract No. W15QKN-19-P-0021 awarded by the U.S. Army. The government has certain rights in the invention.

BACKGROUND

Various fields rely on wind speed and direction determinations to properly function. For example, accurately accounting for crosswind speed is an important factor in long-range ballistics. Reading crosswind is one of the most difficult jobs of a marksman. Systems have been developed to automatically determine wind speed using various equipment. Prior art systems typically use active illumination of a scene (e.g., using infrared or other light), or require a target, or beacon to be included in the scene in order to perform the wind speed and direction determination. Some prior art systems use specialized hardware to determine the wind speed and direction in a scene. However, these prior art systems require specialized and often bulky and expensive equipment, which makes deployment of such tools difficult.

SUMMARY

The disclosed embodiments provide a wind determination method, system, and computer program product for measuring and determining wind speed and direction based on image analysis. In some embodiments, the wind measurement is based on analysis of a received video, such as a series of video images, which may also be described as frames. The video images may be a live, real-time video from a camera, a data stream including real-time video images streamed from a remote camera or system, or a pre-recorded video. According to example embodiments, wind measurement occurs such that wind speed and direction are determined based on analysis of frames of a video captured from an existing standard camera system (e.g., a standard digital camera image sensor and optical hardware), using existing hardware (e.g., processor configured by software, implemented within the camera or on a nearby computer, such as a laptop, smartphone, or similar device, for example). In some cases, a simple additional piece of hardware (e.g., FPGA, DSP, etc.) may be added to a standard digital camera, and may be integrated with the camera system to carry out the image analysis disclosed herein. These implementations minimize cost and increase the ease of deployment.

In some embodiments, the wind speed and direction determination system and/or computer program product can be integrated with firing control systems for ballistic equipment, such as a ballistic projectile dispenser (e.g., a gun) to provide the wind direction and speed information for determining ballistic calculations for aiming the ballistic equipment. This can improve the accuracy of ballistic weaponry, especially at long ranges, such as where atmospheric turbulence affects the visual line of sight between a ballistic projectile dispenser and a target.

According to some embodiments, the image analysis used to determine wind speed and direction analyzes distortion and warping of video images caused naturally in image captures affected by atmospheric turbulence. For example, when viewing subjects in imagery, atmospheric turbulence can cause distortion and warping which effectively blur imagery. In a time sequence of images for a video, each image will be blurred differently due to the constantly changing nature of the atmosphere. For example, wind moving between the viewer (camera/sensor system) and the subject will cause observable changes in the turbulence pattern of the scene, which can be used to calculate wind speed and direction. Highly trained soldiers learn how to intuitively read these blurred patterns to account for wind. The below embodiments disclose a technique to use this effect to analyze wind speed and direction in a predictable, automatic way, using an image sensor, camera, and software. The various embodiments describe a system, method, and computer program product for using the perturbations in imagery imparted by atmospheric turbulence to determine the wind velocity between the observer and the target. For example, one embodiment uses image analysis to calculate wind velocity and direction, and may be a software-only solution that can be easily deployed on a wide variety of platforms and scenarios without additional equipment. This removes the size, weight, and power (SWaP) concerns of adding this capability, and minimizes the cost of acquisition, deployment, support, and maintenance. This also means more soldiers could now have access to information that was previously only available to most highly trained and experienced ones.

BRIEF DESCRIPTION OF THE DRAWINGS

FIG. 2 is a flow chart showing a method of determining wind speed, according to some embodiments;

FIG. 3A is a flow chart showing a method of generating a single wind speed model according to some embodiments;

FIG. 3B is an example showing a set of example model power spectrums;

FIG. 4A is a flow chart showing a method of analyzing a received video, according to some embodiments;

FIG. 4B shows an example of optical flow values for cells of a single frame, and shows a set of n frames;

FIG. 5 is a flow chart showing a method of determining wind direction, according to some embodiments.

FIGS. 8A-8C show experimental results for tested wind speeds, based on simulations, according to some embodiments;

DETAILED DESCRIPTION

Figure 1A:
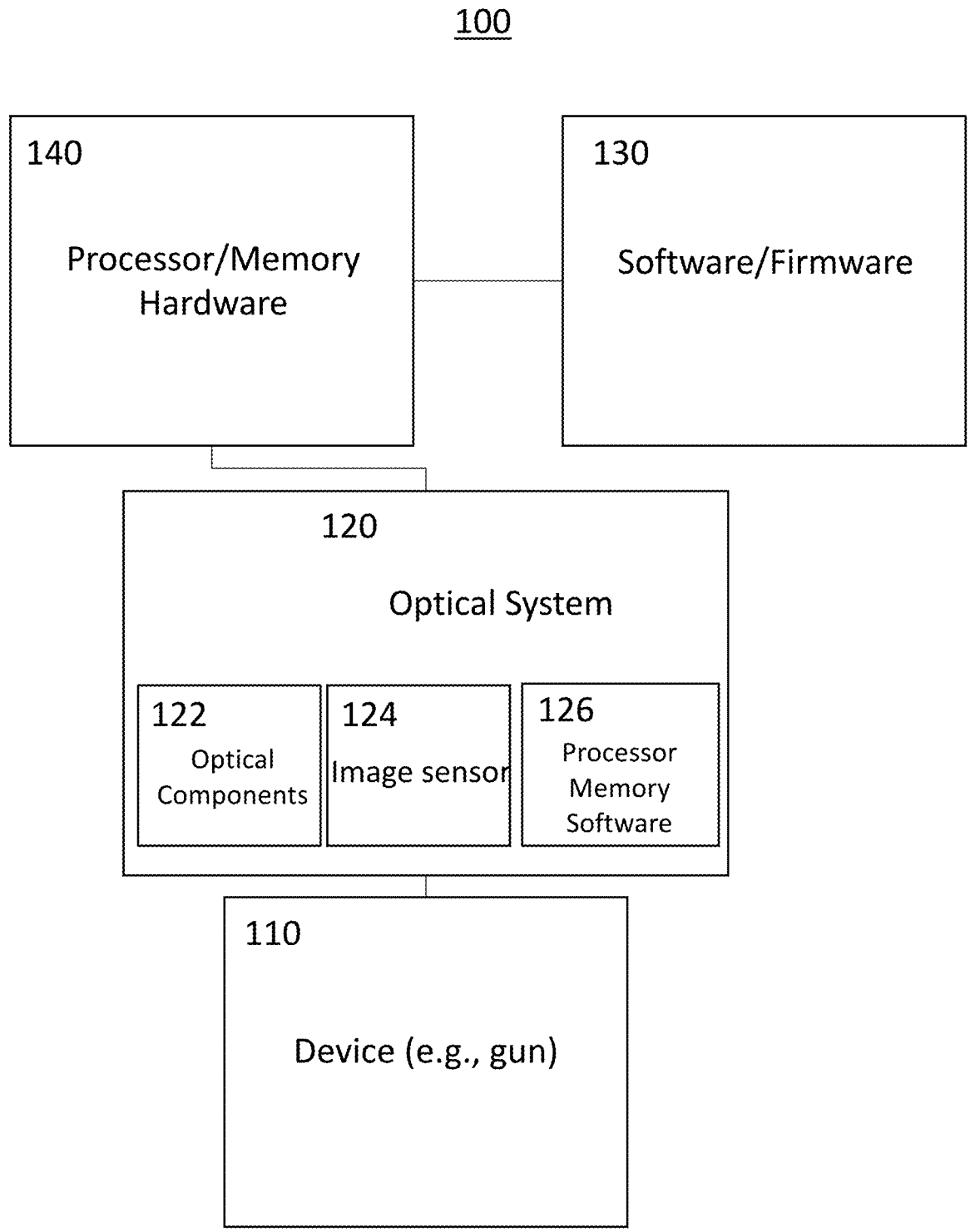
FIG. 1A depicts an example system for determining wind speed and direction, according to some embodiments.

FIG. 1A shows an example system 100 for determining wind speed and direction, according to some embodiments. As can be seen in FIG. 1A, the system 100 includes a device 110, an optical system 120, software and/or firmware 130, and hardware 140.

Device 110 may be a ballistic projectile dispenser, such as a gun or other weapon. However, the invention is not limited to ballistic-type technology, and can be used for other technology or situations that use wind speed and direction information for proper or improved operation, or for better accuracy. For example, the device 110 may be used for systems that need to know turbulence, such as surveillance video enhancement and reconstruction, aircraft flight and landing, and wind power generation, or other systems that benefit from knowing wind speed and direction, such as vehicle and weapons systems testing, aerosol chemical spread prediction, and interplanetary landers.

Optical system 120 may be, for example, an image capture device that captures video images. The image capture device may include optical components 122, such as various lenses, an aperture, and other standard optical hardware for capturing and focusing light. The image capture device may additionally include an image sensor 124, such as a CMOS (complimentary metal oxide semiconductor) image sensor or CCD (charged coupled device) sensor. The image sensor 124 captures video images corresponding to each frame of an image, by converting light into electrical signals at the pixel level. The image sensor 124 may have a particular pixel resolution having pixels of a particular size. For example, existing camera technology can have image sizes 20 of megapixels or more, using an image sensor having an area of about 1×1.5 inches. The optical system 120 may further include a processor, memory, and/or software 126, which are components for controlling operation of the optical system, such as for controlling the taking of pictures or capturing of videos, for performing aperture control and auto focus, for controlling frame rate of videos captured, etc. The memory may be, for example, a memory card, a buffer memory, or other memory cell array configured to store image data. The optical system 120 may be, for example, a standard digital camera, which may be a stand-alone camera, a camera housed in and operated by a smart phone, tablet, or other device. Alternatively, optical system 120 may be a specialized image capture device or scope, for example with more limited capabilities.

Processor and memory hardware 140, and software and firmware 130 may be part of the optical system 120 and/or the device 110 (e.g., embedded within a camera, a device such as a gun, or a combination of the two), or may be included as an external device that can be communicatively (and in some cases physically) coupled to the optical system 120 and/or device 110. For example, in one embodiment, a specialized camera and/or scope is communicatively coupled to the device 110 (e.g., it can be embedded or detachably connected to the device 110, and can communicate via wireless or wired communication protocols), and a controller (e.g., weapon controller) connected to the camera and/or scope is configured to execute software that implements the wind determination methods disclosed herein.

Processor and memory hardware 140 may include, for example, a CPU (central processing unit), a GPU (graphics processing unit), a VPU (vision processing unit), various types of RAM (random access memory) and ROM (read only memory), buffer memory, cache memory, and other standard components.

Figure 1B:
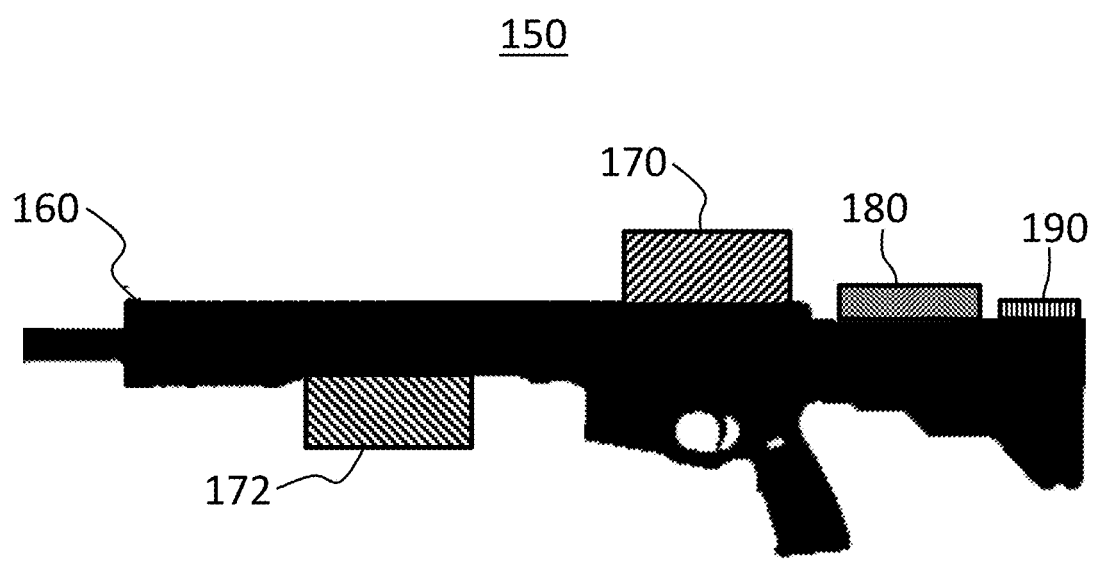
FIG. 1B depicts an example implementation of a specific system for determining wind speed and direction, according to some embodiments.

A number of hardware and software modules may be used to implement the wind determination and device control described herein. For example, as shown in FIG. 1B in one embodiment, a system 150 includes a device 160, such as a rifle, which may be outfitted with a plurality of modules, such as a first optical device 170 (e.g., a scope), a second optical device 172 (e.g., a digital camera or image capture device), a targeting laser (not shown), a controller 180, and a communication system 190, one or more of which may be attachable to or integrated with the weapon. In some embodiments, an additional steering module (not shown) may be attached to the weapon as well.

The first optical device 170 (e.g., scope) may be, for example, a direct view primary optic with augmented reality overlay. For example, it may offer the user a direct view of a target, with augmented reality overlay, such as a target indicator, positional coordinates, and wind speed and direction. The wind speed and direction may be based on the embodiments described herein. The first optical device 170 may receive information from the various connected components, through a communication system 190, such as a wired or wireless communication network used for communication between the various modular components. An example of such a communication system 190 is the Intelligent Rail® system and the Rail Operating System (ROS), developed by T-Worx, described for example in Intelligent Rail®, I-Rail® Technology Platform Features, published by T-Worx (available at https://tworx.com/intelligentrail/), and Rail Operating System (ROS), published by T-Worx (available at https://tworx.com/rail-operating-system-ros), both of which are incorporated by reference in their entirety herein.

A second optical device 172, such as digital camera or other image capture device, may be additionally in communication with the communication system 190. The second optical device 172 may be, for example, the optical system 120 of FIG. 1. As an example, the second optical device 172 may be a modular piece that physically connects to the weapon 160 and that communicates with the communication system 190. The second optical device 172 may be, for example, a specialized camera. In some embodiments, however, the second optical device 172 may be a standard digital camera, or even a smart phone camera, which can attach to the weapon 160 and communicate through the communication system 190. Either the second optical device 172, or a separate component connected to the second optical device 172 (e.g., part of the controller 180) can implement software that determines wind speed and direction according to the various embodiments described herein. In some embodiments, the functions performed by the first optical device 170 and second optical device 172 can be performed by a single device, that combines the viewing and display aspects of the first optical device 170 and the image capture aspects of the second optical device 172. For example, a single scope outfitted with optical components, an image sensor, a display screen, and processing, communication, and memory hardware and software can take the place of separate optical devices 170 and 172.

The controller 180 includes hardware (e.g., one or more processors and memory such as 140 in FIG. 1), and software or firmware (e.g., 130 in FIG. 1), configured to receive various communications, and perform various functions. For example, in an embodiment where the controller 180 includes the software for determining wind speed and direction, the controller 180 may receive the image frames from the second image capture device 172, and may use the image frames in the manner described in greater detail below to determine wind speed and direction.

Furthermore, the controller 180 may be additionally connected to the first image capture device 170, in order to display the wind speed and direction overlaid with the view from the first image capture device 170, to instruct a user viewing the first image capture device 170 of the wind speed and direction. In this manner, a user is informed of the wind speed and direction, and can use that information to aim the weapon 160 appropriately. In addition, the information shown in the first image capture device 170 and determined by the controller 180 can be an aiming target, that simply indicates where to aim the weapon 160 to hit an actual target. The aiming target can be calculated by the controller 180 based on the wind speed and direction and the target distance from the weapon 160, to simplify the aiming for the user and avoid the need for the user to manually adjust the aiming based on a human estimation.

A targeting laser, binocular distance detector, or other device can be used to determine distance between the weapon 160 and a target.

According to certain embodiments, the software used to calculate wind speed and direction in the manner described below can be included in the second optical device 172. For example, if the second optical device 172 is a smart phone, tablet, or similar device, the device can perform the image capture and the processing and calculation to determine wind speed and direction, which can be then communicated to the weapon controller 180. The smart phone, tablet, or similar device need not even be physically connected to the weapon 160. In the case where the second optical device 172 is a specialized camera that physically connects to the weapon 160, either the specialized camera or the weapon controller 180 can include the software that implements the wind speed and direction determination. In some embodiments, an additional module can be connected to the weapon 160 and/or communicate with the weapon controller 180, and this additional module can include the processor, memory, and software for determining the wind speed and direction based on the image frames received from the second image capture device 172. In one embodiment, such a module can be connected to the weapon controller 180 through the Intelligent Rail® system, and the module or the weapon controller 180 can include, for example, an Intel® Movidius Myriad X Vision Processing Unit, as described in Intel® Movidius™ Myriad™ X Vision Processing Unit (VPU) 204770, published by Intel Corporation (available at https://www.intel.com/content/www/us/en/products/processors/movidius-vpu/movidius-myriad-x.html), and "Product Brief, Intel® Movidius™ Myriad™ X VPU, Enhanced Visual Intelligence at the Network Edge," Movidius, an Intel Company, 2018, both of which are incorporated by reference herein in their entirety, to run the computer program code for determining wind speed and direction described in the various embodiments herein.

Additional examples of the first and second optical devices 170 and 172 or a combination thereof include systems that feature both a visible and long wave infrared (thermal) camera. For example, a visible camera can be a standard low power machine vision camera such as the Basler Pulse puA2500-14uc, which features 2.2 micrometer pixels, and takes standard C-mount lenses. The camera can be operated at 1920×1080 at 30 frames per second, but also can be adjusted to use smaller resolutions which will support frame rates in the 100s of frames per second. A thermal camera, such as an uncooled microbolometer camera (e.g., the FLIR BOSON 640) operating at approximately a 10-micrometer wavelength can also be used. The thermal band will experience the same shifts in angle of arrival as the visible band making the band suitable for the uses described herein. However, the larger pixel size may make extracting small shifts more difficult without a larger focal length lens. So in one embodiment, a visible camera may be used for windspeed calculation, and a thermal camera could function as a backup or to confirm calculations.

The computer code and computer program product described herein for determining wind speed can be integrated with or can communicate with ballistics control software such as the Government Ballistics Software—Small Arms (GBS-SA) ballistics solver program. The GBS-SA receives inputs from various sensors present in the system as well as configuration data from the user, and generates an aim-point correction to be presented to the user as a disturbed reticle. In one embodiment, the computer program product described herein for determining wind speed includes an interface to this program to provide wind speed measurements for ballistic calculation, for aiming adjustments.

FIG. 2 is a flow chart showing a method of determining wind speed, according to some embodiments. In step 210, a plurality of wind speed models are generated and stored. In one embodiment, each wind speed model correlates a wind speed with an associated mathematical representation of image shift temporal behavior, such as a power spectrum, and an associated set of parameters (e.g., optical system parameters, distance from the optical system to a target in the video, etc.). A plurality of models are generated and stored, for example in a database. The database storage may be implemented in a memory device or other hardware storage device, for example as part of a module that includes a processor, memory, and software for determining the wind speed and direction, or in a storage or memory accessible by a controller such as discussed in connection with FIG. 1B. The following table shows an example set of wind speed models and their associated data. The table is exemplary only, and in practice a much larger table (for example, having tens, hundreds, or thousands or more rows of entries, and optionally other columns of other parameters) would be used. The values given are also only examples, and do not necessarily correspond to actual tested data.

TABLE 1

| Wind Speed (mph) | Power Spectrum | Distance (m) | Aperture Setting | Frame Rate (fps) | Patch Size (pixel area) |
|---|---|---|---|---|---|
| 2 | Spectrum 1 | 100 | f/2.8 | 120 | 64 P |
| 2 | Spectrum 2 | 200 | f/2.8 | 120 | 64 P |
| 5 | Spectrum 3 | 1000 | f/2.8 | 240 | 64 P |
| 5 | Spectrum 4 | 1000 | f/8 | 240 | 64 P |
| 10 | Spectrum 5 | 500 | f/8 | 120 | 64 P |
| 15 | Spectrum 6 | 500 | f/8 | 120 | 64 P |

As can be seen, each model may include a wind speed, a power spectrum, a distance, an aperture setting, a frame rate, and a patch size. The wind speed may represent a component of wind speed in a particular direction (e.g., in the direction in which the wind is blowing, or in a direction different than the blowing direction such as a horizontal direction perpendicular to a line of sight). The power spectrum represents one example of a mathematical representation of image shift temporal behavior for each model, and is described in greater detail later. Distance may refer to a distance between the image capture device and a target. Aperture setting and frame rate may refer to an aperture setting and frame rate setting for the image capture device. Patch size may refer to a size of portions of each frame used to review for image shift temporal behavior. For example, to review image shift temporal behavior, rather than analyze every pixel for each video frame, a group of pixels that form a patch (e.g., 64 pixels in one example, which may represent an X-by-Y size such as 8×8 for 64 pixels) may be analyzed. The number of pixels selected for a patch may be based on a focal length and pixel size, for example. Examples of how models are generated are discussed in greater detail below in connection with FIGS. 3A-3B. Instead of generating models ahead of time and storing them in a database, models may be generated in real time during operation. Both of these methods are described in greater detail below.

In step 220, a video is received, along with parameters, such as optical system parameters (e.g., aperture setting, frame rate, etc.) and a distance. For example, the parameters received can be the same parameters as are included in the database of wind speed models (e.g., distance, aperture, frame rate, and patch size). The video is analyzed to determine a power spectrum for the video, as well as a distance from the optical system to the target. Distance from the optical system to the target may be determined based on known technologies, such as stereoscopic or laser-based distance detection, for example. The optical system parameters such as aperture setting and frame rate are stored, along with the distance, and power spectrum. The video need not be a video received in real-time. As discussed further below, the video can be a pre-recorded video, or video received in other manners. The video may also be referred to in some contexts as a received video, or current video.

In step 230, the data stored in association with the video is compared to the data stored in the database of wind speed models, to find a best matching wind speed. For example, an exact or closest distance, aperture value, frame rate, and patch size combination can be located in the table, and for that set of parameters and parameter values, one or more wind speed models each having an associated wind speed and power spectrum may be located. For each wind speed model, the entire power spectrum curve or a given portion of the associated power spectrum curve can be compared to an entire power spectrum or the same portion of the power spectrum for the video, and the difference between the two power spectrums can be determined. For example the difference between the two power spectrums can be based on a root mean square error over the given portion of the power spectrum curve. A comparison algorithm or computer program can perform these comparisons and can then select a model power spectrum that most closely matches the power spectrum of the video, according to the determined differences, to find a closest match. Based on the closest matching power spectrum from the model data that matches the current video being compared, the associated wind speed from the model database (e.g., associated with the closest matching power spectrum) can be selected and output (step 240) as the wind speed in the current video. The wind speed selected and compared may be, for example, a component of wind speed in a particular direction. For example, in one embodiment, the wind speed stored in the wind speed models and determined in the comparison with the video is the speed for a horizontal component of wind in a direction perpendicular to a line of sight. Methods for determining the direction of wind will be discussed in greater detail below.

Various software programs can be used to perform this comparison. For example, in one embodiment, Python wrappers are used for each model, enabling the models to be used with fitting and analysis libraries such as SciPy and plotting libraries such as Matplotlib. In one embodiment, computed shifts from actual received data are saved to .csv files and the files are analyzed using Python programs to perform the comparisons. In addition, the software used to determine passive wind estimation using the hardware described herein can be described as including modules. For example, one module may be a data preparation program module that produces inputs, for example, based on received video images. This can include pre-processing, and is described in more detail in connection with FIG. 5. Another module can be a spatial analysis program module that produces optical flow data from the inputs produced by the data preparation program, and outputs the optical flow data for wind speed and direction determination or estimation. A third module can be a wind speed estimator program module, which uses the output from the spatial analysis program module to estimate a wind speed. The wind speed estimate may correspond to the wind speeds determined according to the various embodiments described herein, including determining a mathematical representation of image shift temporal behavior. A fourth module can be a wind direction estimator program module, which uses the output from the spatial analysis program module to determine a wind direction. Each software or hardware block, unit, or module described herein and throughout the specification may be separated into two or more interacting and discrete blocks, units, or modules without departing from the scope of the inventive concepts. Further, the different blocks, units, and modules of the embodiments may be physically combined or consolidated into more complex blocks, units and/or modules without departing from the scope of the inventive concepts.

FIG. 3A is a flow chart showing a method of generating a single wind speed model according to some embodiments. This process can be repeated for a set of wind speeds for different sets of parameter values to generate a table such as depicted in Table 1.

In step 310, an equation or program code is created to simulate power spectrums based on input parameters. For example, the input parameters may include wind speed, and also the parameters described in Table 1, such as distance, frame rate, aperture, and patch size. The equation or program code may include the wind speed and the parameters as variables, and may calculate or determine a power spectrum for each set of specific parameter values. In one embodiment, the equation or program code models the atmosphere as infinitely thin sheets with a phase composed of sums of sinusoids, and computes the variance of generalized tilt for one infinitely thin sheet. Since generalized tilt is a linear operator on the phase, the variance for the whole path may be the weighted integral over the variances for each sheet. The power spectrum is computed from the frozen flow hypothesis using a change of variables. This result forms the model equation. The model equation is shown in Equation 1 where $\Phi_n^o(\kappa)$ is the spatial power spectrum, e.g. Kolmgorov spectrum, of the turbulence, $$k = \frac{2\pi}{\lambda},$$

$C_n^2(z)$ refers to the atmospheric turbulence structure constant, z corresponds to a position along a path, v(z) is the transverse wind speed at a current location or particular position, $\phi_v(z)$ refers to an angle of transverse wind at a current location or particular position, σ refers to variance of the quantity of interest, (e.g., variance of shift for a patch), d(z) is the transverse separation between point sources, λ is wavelength, $\vec{K}$ is a wave vector for a single sinusoidal phase profile, $\phi_k$ is the angle of the $\vec{K}$ vector, and $\phi_d$ is the angle of the transverse separation of two point sources.

Equation 1:
Master equation for computing path integrated power spectral density from the variance of a single sheet of turbulence.

$$PSD(\vec{f}) = 32\pi^3 k^2 f \int_0^L C_n^2(z)v^2(z)dz \int_{\frac{\pi}{2}}^{\frac{\pi}{2}} \sec^2 \phi_f$$
$$\Phi_n^0\left(\frac{2\pi f}{v(z)\cos(\phi(f))}\right)\sigma^2\left[\frac{2\pi \vec{f}}{v(z)\cos(\phi_f)}, \phi_f + \phi_v(z), z, L\right]d\phi_f$$

In one embodiment this equation is generalized for non-point-source targets by integrating over a gaussian patch based on the number or size of a "patch" of pixels on the target. This size matches the size used for computing the power spectrum from the video.

Equation 2: Patch averaged variance equation.

$$<\alpha_P^2> = <\alpha_{P1}, \alpha_{p2}> = \frac{\int\int <\alpha(\vec{\theta_1})\alpha(\vec{\theta_2})> P_g(\vec{\theta_1})P_g(\vec{\theta_2})d\vec{\theta_1}d\vec{\theta_2}}{\int\int P_g(\vec{\theta_1})P_g(\vec{\theta_2})d\vec{\theta_1}d\vec{\theta_2}}$$

Equation 3: Covariance expression for two point sources at $\vec{\theta_1}$ and $\vec{\theta_2}$ in terms of the variance of a single point source.

$$<\alpha(\vec{\theta_1})\alpha(\vec{\theta_2})> =$$
$$\frac{1}{2}|\cos(Kd(z,\theta_1)*\cos(\phi_k - \phi_d(z,\theta_1)) - Kd(z,\theta_2)*\cos(\phi_k - \phi_d(z,\theta_2)))$$
$$\sigma^2[\vec{K}, z, L]|$$

Equation 4: Variance for a single point source,
as described in Shaw and Tomlinson
(S.E.J Shaw and E.M. Tomlinson,
"Analytic propagation variances and power spectral densities from a wave-optics perspective,"J. Opt. Soc. Am. A,
vol. 36, no. 7, p. 1267–78, Jul. 2019,
incorporated herein by reference in its entirety).

$$\sigma^2[\vec{K}, z, L] = \frac{8}{k^2}\cos^2(\phi_m - \phi_k)\cos^2\left(\frac{\vec{K}^2 D(z)(L-z)}{2kD(L)}\right)J_1^2\left(\frac{D(z)\vec{K}}{2}\right)$$

Equation 5: Patch averaged variance for a single turbulence sheet.

$$\int\int \frac{1}{2}|\cos(Kd(z,\theta_1)*\cos(\phi_k - \phi_d(z,\theta_1)) -$$
$$Kd(z,\theta_2)*\cos(\phi_k - \phi_d(z,\theta_2)))$$
$$\frac{\sigma^2[\vec{K}, z, L]|P_g(\vec{\theta_1})P_g(\vec{\theta_2})d\vec{\theta_1}d\vec{\theta_2}}{\int\int P_g(\vec{\theta_2})d\vec{\theta_1}d\vec{\theta_2}}$$

The phase screen model is used to compute the variance of tilt averaged over a Gaussian patch for a single sheet of turbulence, for example, following the method of S. R. Bose-Pillai et al., "Estimation of atmospheric turbulence using differential motion of extended features in time-lapse imagery," Opt. Eng., vol. 57, no. 10, pp. 104108-1-104108-12, 2018, which is incorporated herein by reference in its entirety. Bose-Pillai shows that the patch averaged variance is formulated as the correlation between the tilt for two patches with the same origin and extent, this expression is shown in Equation 2 where $P_G(\vec{\theta})$ is the function of a Gaussian window, and $<\alpha(\vec{\theta_1})\alpha(\vec{\theta_2})>$ is the covariance of tilt for two point sources at $\vec{\theta_1}$ and $\vec{\theta_2}$ respectively. This covariance can be computed for a single sheet of turbulence using the phase screen model, following Shaw and Tomlinson. This result is shown in Equation 4, where D (z) is 0 at the target and equal to the aperture diameter at the observation aperture.

Next, Equation 5 is inserted into the model equation, Equation 1, for converting a single sheet variance into a power spectrum. In one embodiment for a horizontal path case where turbulence is assumed constant along the imaging path, the $C_n^2(z)$ parameter is constant and becomes a scaling parameter.

The result of this equation is a 6-dimensional integral. In one embodiment this is evaluated numerically using Monte-Carlo integration.

In step 320, a set of input parameter values are selected, along with a wind speed. For example, a wind speed and parameter values in the first row of Table 1 may be selected.

In step 330, the parameter values and wind speed are inserted into the equation or program code created in step 310, and a power spectrum is calculated or determined.

In step 340, the calculated or determined power spectrum is stored in the database in association with the wind speed and parameters used to perform the calculation or determination, thereby storing a wind speed model.

As mentioned previously, this can be repeated for different sets of parameter values and wind speeds to create a database including a plurality of models (e.g., tens, hundreds, or thousands of models). Also, the model generation process shown in FIG. 3A can be performed in advance of actual wind speed determinations, or in real-time, for example, based on actual parameter values used or expected to be used for an actual video just before the video is received. For example, steps 320-340 can be performed on site, based on actual parameter values being used and an estimated general wind speed or range of wind speeds. In addition, the plurality of models can be automatically created based on input ranges and step values, for example, to include all possible combinations based on the input ranges and step values. For example, a user can input an estimated range of wind speeds (e.g., from 5-15 mph) in specific increments (e.g., 1 mph), a single aperture setting value and frame rate value being used by an image capture device, an estimated range of distances (e.g., 100-300 m) in specific increments (e.g., 1 m), and a particular desired patch size to use. Therefore, in this particular example, a set of 11×101 (e.g., 1, 111) wind speed models can be created in real-time on site. Generating models in real-time can create a smaller model database, which can be searched more quickly and thus improve the speed and efficiency of wind speed determinations, while maintaining accuracy.

Though one specific method of generating models of power spectrums that correspond to particular wind speeds is described above, other methods may be used to generate models. For example, though more time-consuming, actual testing can be performed, where wind speeds and all other parameters are known, in order to generate a model power spectrum for different known sets of parameters and wind speeds, and these models can be stored. These power spectrums can be developed based on a method such as described in connection with FIGS. 4A-4C.

FIG. 3B depicts an example of a set of power spectrums calculated or determined for different wind speed models, which may have different wind speeds and/or different parameter values from each other. The X-axis shows a frequency, and the Y-axis shows a power.

FIG. 4A is a flow chart showing a method of analyzing a received video. For example, the video can be a video received in real-time by a digital camera, can be a streamed video received over a network in real-time or near real-time, can be a pre-recorded video, or can be a simulated video.

In step 410, a set of video frames for a video are received, along with a set of known parameter values. Keeping with the above example, those parameters could be an aperture setting and frame rate of the optical system, a distance from the optical system to a target in the video, and a patch size. The number of frames can be, for example, 64 frames. However, other frame numbers, as well as values for other parameters can be received as well. The patch size can include, for example, a number of pixels, which may represent an X-by-Y size (e.g., 8×8 for 64 pixels). The parameters can be stored in a memory (e.g., a volatile memory, non-volatile memory, main memory, buffer memory, or other type of memory).

In step 420, pre-processing may be performed on the video. For example, image stabilization and other processing may be performed to result in a clearer and more stable video. Known technologies can be used to perform the image stabilization. Step 420 can be an optional step, and therefore may not be performed in some embodiments.

In step 430, a reference frame is formed from the video. For example, the set of frames that comprise the model video can be averaged to form a reference frame. In one embodiment the reference frame is created via bispectral averaging and filtering using software such as EM Photonics ATCOM software. An example of a bispectral averaging process is described by U.S. Pat. No. 7,245,742, to Carrano et al., which is incorporated herein by reference in its entirety. The bispectral averaging process involves breaking the image down into overlapping tiles, Fourier transforming these tiles, computing a bispectrum of these Fourier transforms for each image, averaging the bispectrums for each image, and performing a phase estimation to produce the output phase of the corrected image. The average power spectrum is also computed and filtered and then combined with the reconstructed phase and inverse Fourier transformed to produce a corrected image.

Additional methods for forming a reference image from a plurality of frames can be seen in U.S. Pat. No. 8,300,968 to Ortiz et al.; in E. Kelmelis, S. Kozacik, and A. Paolini, "Practical considerations for real-time turbulence mitigation in long-range imagery," Opt. Eng., vol. 56, no. 7, pp. 071506-1-071506-12, July 2017; and in C. J. Carrano, "Speckle imaging over horizontal paths," in International Symposium on Optical Science and Technology, pp. 109-120, Jul. 8, 2002," each of which are incorporated by reference herein in their entirety.

In step 440, the image for each frame from the video is compared to the image for the reference frame to generate an optical flow for each frame. Optical flow relates to a spatial analysis over time, such as pixel or patch-wise motion between two frames. For example, the image for each frame may include a set of cells that are individually compared to a corresponding set of cells of the image in the reference frame. For example, each cell may include a single pixel, or may include a group of pixels (e.g., each cell may have the selected patch size). In this manner, for each cell, an optical flow between the reference frame and the given frame being analyzed can be determined. Optical flow techniques can be either sparse, where not all pixels or patches are analyzed or accounted for, or dense, wherein for example the entire image's motion is described, for all pixels or patches. Sparse optical flow techniques can reduce processing requirements, but dense optical flow techniques can provide more complete and accurate information. In addition, to simplify processing, optical flow results can be downsampled, for example, using Gaussian kernel (e.g., using a 3×3 kernel).

Different optical flow methods can be used. For example, one method, described as Farneback's method, is described in G. Farneback, "Two-frame Motion Estimation Based on Polynomial Expansion," Scandinavian Conference on Image Analysis, Springer, Berlin, Heidelberg, Jun. 24, 2003, which is incorporated herein by reference in its entirety. Another optical flow method is Dense Inversion Search (DIS), which is described in T. Kroeger et al., "Fast Optical Flow Using Dense Inversion Search," European Conference on Computer Vision, Springer, Cham, 2016, which is incorporated herein by reference in its entirety. A third optical flow method is known as Dual TV-L1, described in C. Zach, T. Pock, and H. Bischof," A Duality Based Approach for Realtime TV-L1 Optical Flow," DAGM 2007, LNCS 4713, pp. 214-223, 2007, and J. Sánchez Pérez, E. Meinhardt-Llopis, and G. Facciolo, "TV-L1 Optical Flow Estimation," Image Processing On Line, pp. 137-150, July 19, 2013, each of which is incorporated by reference herein in its entirety. The result is a set of optical flow values for each frame corresponding to a set of cells for that frame. FIG. 4B shows an example of optical flow values for cells of a single frame, and shows a set of n frames, each of which would include another set of optical flow values for its cells. These example optical flow values are given for explanation only and do not necessarily represent actual flow values.

In step 450, a power spectrum is generated for each cell, using the set of optical flows of that cell for the set of frames. For example, the optical flow values for a kth cell for n frames may combined and transformed into a frequency domain (e.g., using a Fourier transform), to result in a single power spectrum for that cell.

Figure 4C:
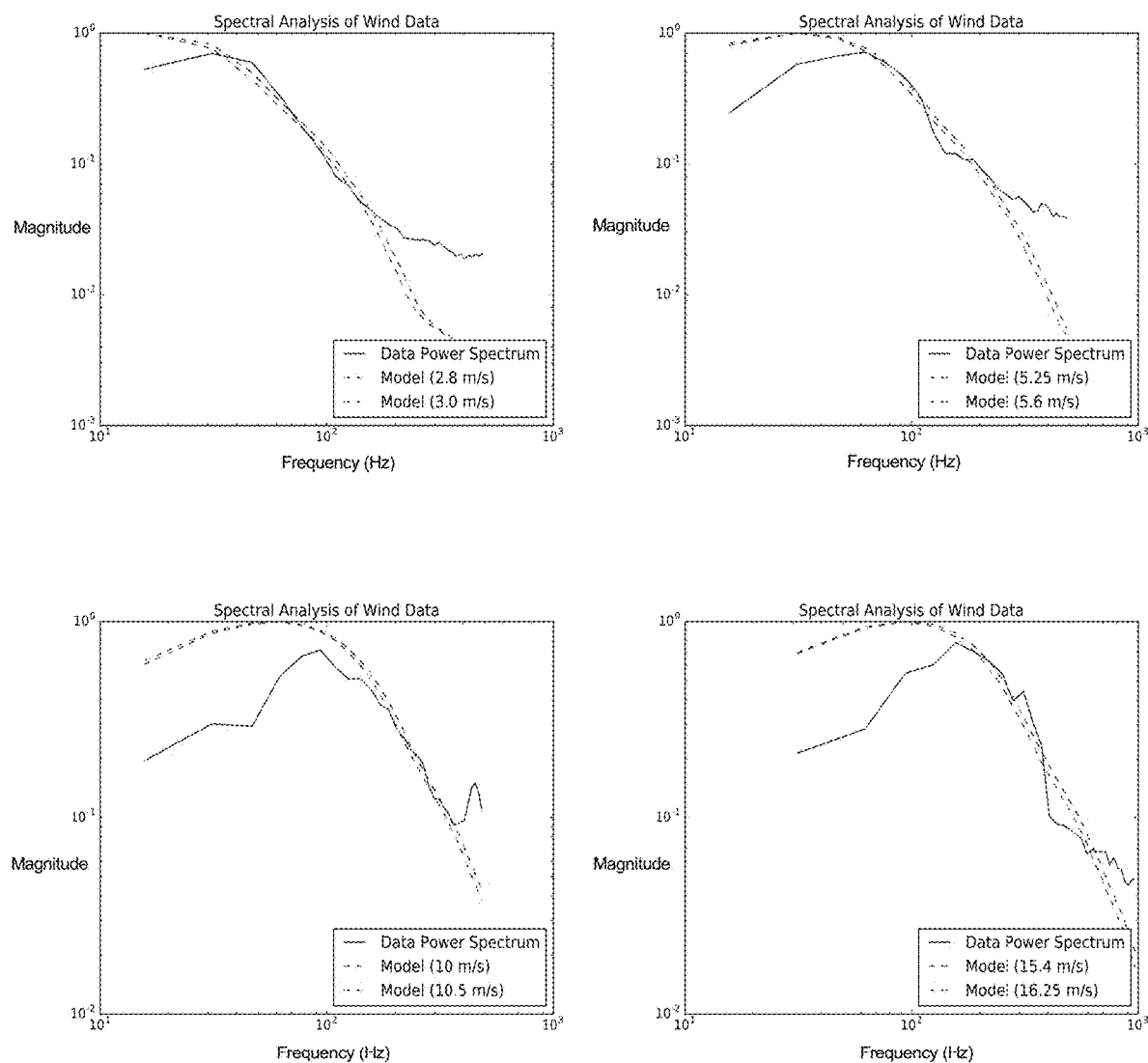
FIG. 4C shows a set of example power spectrums compared to model power spectrums.

In step 460, an average power spectrum is calculated for the entire video (e.g., for the selected patch size). The average power spectrum may be calculated, for example, by using the power spectrums for all of the cells to determine an average. A single average power spectrum for the entire video (e.g., based on the patch size) may therefore be created. An example power spectrum calculated in this manner is depicted in FIG. 4C. FIG. 4C also shows a comparison between this power spectrum and a model power spectrum, which may be performed in step 230 of FIG. 2. The "entire video" in this case can be any set of frames of a continuous video that is selected for analysis.

In an optional step 470, post-processing on the average power spectrum may be performed. For example, light smoothing on the average power spectrum may be performed to reduce noisy peaks. As an example, a Savitzky-Golay filter with a particular window size and order of linear fit can be used. FIG. 4C may also represent a post-processed average power spectrum.

The average power spectrum for the video is then stored in a memory in association with the parameter values.

Figures 6A, 6B, 6C, 6D:
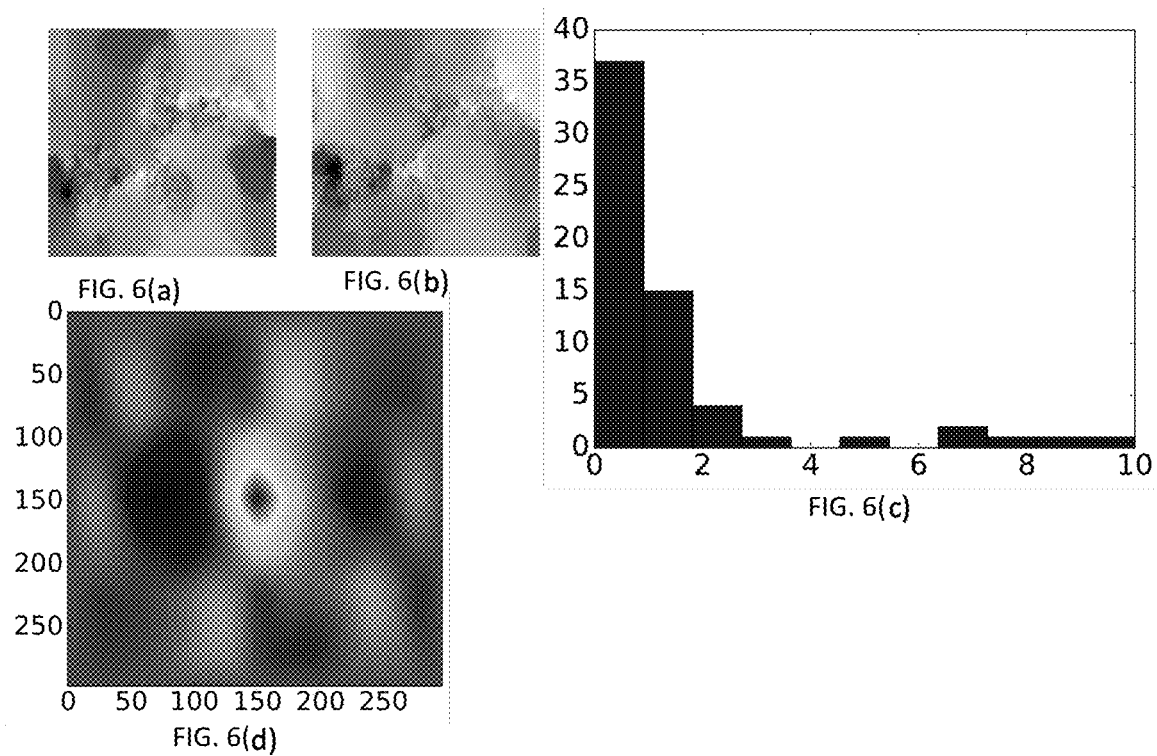
FIGS. 6(a)-6(d) are graphical images of image shift, according to one example.

FIG. 5 is a flow chart showing a method of determining wind direction. FIG. 6(a) is an x-Shift map over an image at time t=0, FIG. 6(b) is an x-Shift map over an image at time t=1, FIG. 6(c) is a histogram of x-Shift correlation peak shifts for 1 timestep over the whole image sequence, and FIG. 6(d) is an average correlation of x-Shifts between images separated by one time step. FIGS. 5 and 6(a) to 6(d) are described below.

In one embodiment, the process described in FIG. 5 determines a direction of the wind transverse (e.g., perpendicular) to the line of sight. This may be, for example, in a horizontal direction, parallel to the ground, or in a vertical direction, perpendicular to the ground, or in other directions along a plane perpendicular to the line of sight. Steps 510-540 can be the same steps as steps 410-440 in FIG. 4, and therefore a repeated discussion is not discussed for the sake of brevity.

To compute the transverse wind direction, the spatial correlations of the two-dimensional map of x-directed shifts across the image, between images taken at adjacent time steps are computed (step 550). FIGS. 6(a) and 6(b) are examples of x-directed shifts for two adjacent time steps. Since the atmospheric phase governs the shifts and these phase maps translate across each object with the transverse wind speed, the shift observed at each object point will be correlated with other points at a later or earlier time depending on their spatial separation and the wind direction.

When the wind is flowing right to left across an object it will be observed as left to right in the image because the image is a mirror image of the object, when using a single lens system. The correlation between the shift maps of temporally adjacent images at each time step is computed, and an example of these shift maps is shown in FIGS. 6(a) and 6(b). These shift maps represent the instantaneous shift of a particular patch relative to the center of this patch in the reference image. The maps are laid out in two dimensions corresponding to the center location of the patch in the reference image and the instantaneous shift is shown as a gray level. It can be seen in these images that the shift map translates to the right between time step 0 (e.g., FIGS. 6(a)) and 1 (e.g., FIG. 6(b)) as the "clouds" in time step 0, have shifted to the right of the image in time step 1. FIG. 6(c) shows a histogram of the peak movement, with the x-axis representing the movement of the shift map between adjacent frames with positive numbers being to the right normalized to the distance between patches, and the y-axis representing the number of frames attaining this value. This histogram features exclusively positive numbers, indicating the direction of wind from the left of the image to the right. Additionally, FIG. 6(d) shows the average correlation between temporally adjacent shift maps. The axes represent the location in the two dimensional correlation output of 148×148 P shift maps where the center of the image corresponds to a zero shift and left/below center represents a negative shift, and right/above represents the strength of the correlation with blue (appearing in most of the figure) representing 0 correlation and red (appearing near the center of the figure but slightly to the right) representing 100% correlation. This also shows a strong trend to the right, identifying translation to the right of the image, and thus right to left wind across the object.

In some embodiments, a single wind direction in a direction perpendicular to one line of sight direction is determined. Based on this determination, which may determine, for example, whether a transverse portion of wind perpendicular to the line of sight extending along a center of an image is moving left or right, along with the wind speed determined in connection with FIGS. 3 and 4, a user may be notified of a wind speed and direction, and/or software may indicate an adjusted aiming direction to use to hit a target. However, in some embodiments, in addition to a direction along a line of sight extending along a center of an image, for additional directions that extend at an angle with respect to the line of sight extending along the center of the image, one or more wind directions can be determined that are transverse to a line of sight extending at an angle with respect to a center of the image. In one embodiment this can be using portions of the image that are off center to measure multiple angles. In this case, using geometrical calculations, a wind speed and direction can be determined for various points along a plane or arc at certain distances or a certain radius from the image capture device, and based on these wind speeds and directions, both a crosswind component and headwind component of wind along the original image-centered line of sight can be determined.

Figure 7:
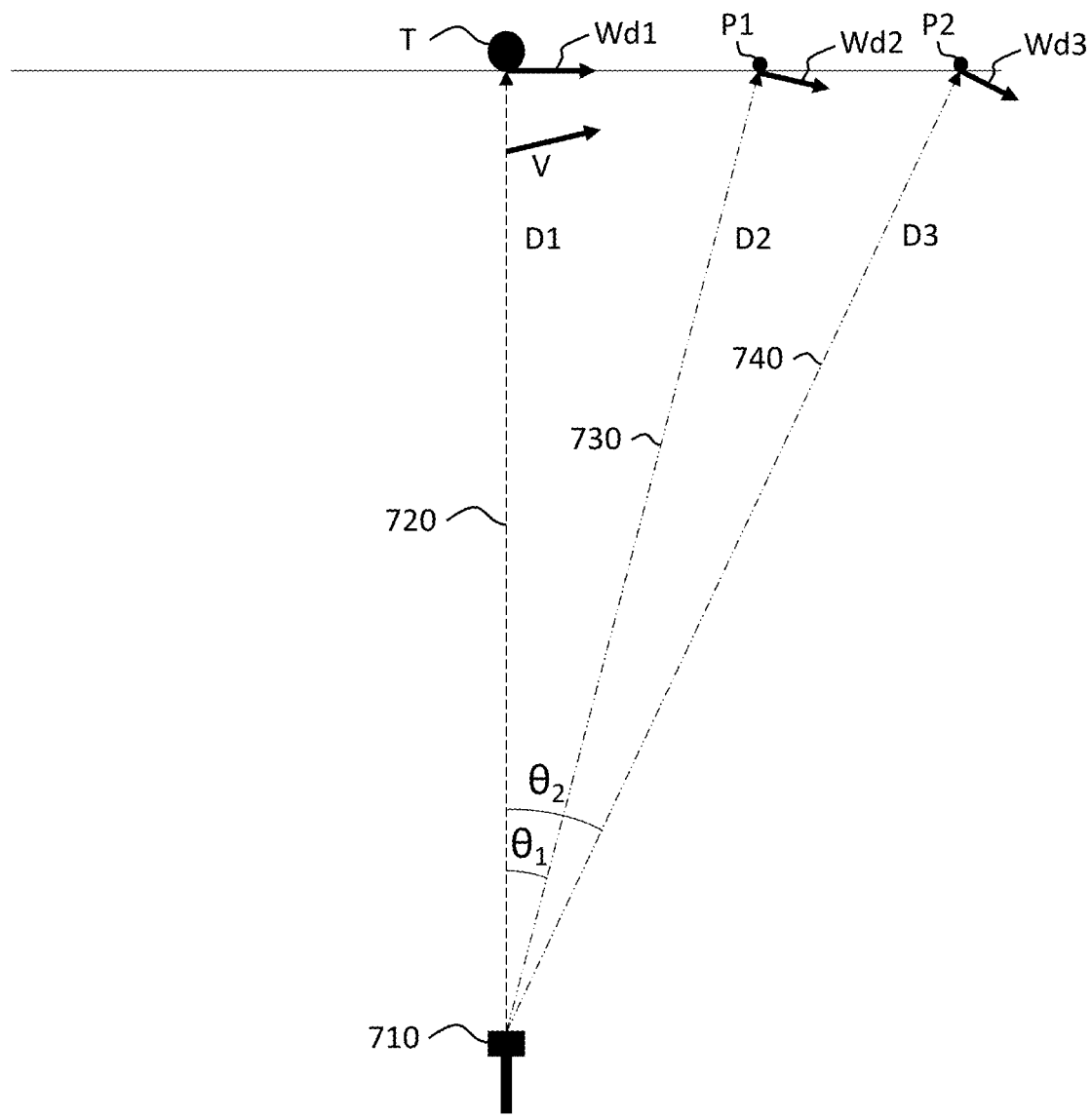
FIG. 7 is an example diagram showing different wind directions that can be used to determine a wind vector having a magnitude and direction, according to some embodiments.

An example of this is shown in FIG. 7. A first, image-centered line of sight 720 extends from the image capture device 710 to the target T. An example wind speed calculated for the distance D1 between the image capture device 710 and target T may be, for example 10 mph, and a determined wind direction Wd1 may be toward the right, perpendicular to the image-centered line of sight 720. An example wind speed calculated for the distance D2 between the image capture device 710 and a point P1 at a first angle $\theta_1$ with respect to the first line of sight 720, along a second line of sight 730, may be, for example 7 mph, with a wind direction again toward the right, perpendicular to the second line of sight 730. An example wind speed calculated for the distance D3 between the image capture device 710 and a point P2 at a second angle $\theta_2$ with respect to the first line of sight 720, along a third line of sight 740, may be, for example 5 mph, with a wind direction again toward the right, perpendicular to the third line of sight 740. Based on these values (e.g., distances D1-D3, wind speeds, wind directions, and angles $\theta_1$ and $\theta_2$), a crosswind and headwind component of the wind with respect to the image-centered line of sight 720 at the target can be determined, and so a wind vector V with respect to the image-centered line of sight 720 and including a magnitude and direction can be determined. All of these determinations and calculations can be made by the software and hardware of the system for determining wind speed such as discussed in connection with FIGS. 1A and 1B, and if integrated with an aiming system, can be used to assist a user in properly aiming a weapon to account for the wind speed and direction.

In some embodiments, moving objects may be in the scene, which could cause certain effects on the wind determination. However, the effects of moving objects in the scene can be mitigated by various techniques, including, for example, computing the difference of shifts between pairs of points and fitting to a model for the power spectrum of differential tilt, pre-segmenting moving objects out of the imagery using known image processing techniques and avoiding measuring shifts in these regions during model fitting or shift computation, and using a local window rather than the entire image where the window is restricted to a region where shifts are most likely to be caused by atmospheric turbulence, rather than by other occurrences such a object movement, for example. Additionally, the effects of movement can also be mitigated during model fitting. For example, in one embodiment linear trends in the video data are removed before computing the power spectrum. In another embodiment, models for shifts at different angles, e.g. x-directed shift, and y-directed shift, are used simultaneously to avoid outliers caused by moving objects. In another embodiment, shifts with greater magnitude than expected (e.g., above a threshold amount) to be caused by turbulence are removed before fitting. In some embodiments, when a machine vision camera is used, the sensor itself may be windowed to a smaller region of the sensor (e.g., only a portion or region of image data from the sensor may be communicated to the analysis software) allowing for removing regions with movement and increasing the frame rate of capture.

Experimentation and Test Results

The system, method, and computer program product described herein were tested to determine accuracy of wind speed determinations. Various findings and adjustments were made.

Existing machine vision cameras often allow higher frame rate when using a smaller area or window of the sensor. Therefore, by selecting appropriate windows to analyze, rather than analyzing entire images, one or more smaller windows collected at a higher frame rate can be used to compute wind speed, while still allowing the camera to be used for other purposes and maintain its wide field of view.

The algorithm used during certain testing to determine the power spectrum employed a small spatial sampling to compute accurate shifts. Small spatial sampling can be accomplished in different ways. For example, smaller pixels can be used, or a larger focal length can be used. Pixel sizes on the order of 2 micrometers, and low SWaP-c (size, weight, power, and cost) long focal length lenses such as mirror lenses, which can provide adequate focal length for wind speed measurement, are now available. Off the shelf versions of these lenses can provide 500 mm of focal length with aperture sizes on the order of 3", with weights less than 1 lb. This, coupled with a large sensor consisting of small pixels will allow the field of view to be sufficient for various applications, and provide the spatial sampling, and frame rate (e.g., when adapted with windowing), for this technique as well as others that benefit from high frame rates, such as turbulence mitigation.

Another option to obtain higher focal length, maintain field of view, and maintain SWaP-c, is the use of advanced techniques such as freeform optics.

During testing, it was found that temporal sampling requirements determine the frame rate of the camera that should be used for most accurate results. For example, the cutoff frequency for a layer of turbulence at the aperture only is approximately 0.3 V/D (where V is windspeed in any unit of distance measure per second, and D is aperture size, in the same unit of distance measure as V) with layers further from the aperture resulting in a lower cutoff frequency. To demonstrate a worst-case scenario, layers near the aperture were used to determine the minimum sampling requirements. For a reasonable aperture size of 50 mm and a maximum wind speed of 30 MPH (13.2 m/s), this resulted in a frame rate of 158.4 frames per second for accurate results.

A model was also used to plot the expected power spectrum of the x and y directed shifts (e.g., vertical and horizontal) for frequencies up to 150 Hz. FIGS. 8A-8C show these results for wind speeds between 0.5 and 15 m/s. These results agree with previously-determined approximations, showing significant decrease for frequencies above 80 Hz.

Optical sampling requirements were computed assuming a sub pixel registration accuracy for shifts of 0.01 pixels. The variance for generalized tilt, described in S. Gladysz, "Absolute and differential G-tilt in turbulence: theory and applications," Optics in Atmospheric Propagation and Adaptive Systems XIX, vol. 10002, p. 100020E-1-100020E-9, Nov. 1, 2016, which is incorporated herein by reference in its entirety, can be computed as $$\sigma_G^2 = 0.34\left(\frac{D}{r_0}\right)^{\frac{5}{3}}\left(\frac{\lambda}{D}\right)^2$$

with $$r_0 = (0.16 C n^2 k_0^2 L)^{\frac{3}{5}}.$$

The per pixel field of view needed to measure 100 different shift levels across 4 positive and 4 negative standard deviations was then computed. These calculations were performed for low turbulence and short range to determine the worst-case scenario and used visible and infrared wavelengths. These optical requirements can be seen in the following table.

TABLE 2

| L (m) | $C_n^2$ | wavelength (m) | D | r0 (m) | Angular Displacement Variance | Necessary IFOV | Pixel Size (m) | Req. Focal Length (m) |
|---|---|---|---|---|---|---|---|---|
| 500 | 3E−15 | 5.5E−07 | 0.05 | 0.127 | 8.74E−12 | 2.37E−05 | 2.2E−06 | 0.093 |
| 500 | 3E−15 | 0.000012 | 0.05 | 5.12 | 8.74E−12 | 2.37E−05 | 0.000012 | 0.507 |
| 200 | 3E−15 | 5.5E−07 | 0.05 | 0.219 | 3.5E−12 | 0.000015 | 2.2E−06 | 0.147 |
| 500 | 3E−15 | 0.000012 | 0.05 | 5.12 | 8.74E−12 | 2.37E−05 | 0.000012 | 0.507 |
| 200 | 3E−15 | 5.5E−07 | 0.079365 | 0.219 | 3E−12 | 1.39E−05 | 2.2E−06 | 0.159 |
| 500 | 1E−14 | 5.5E−07 | 0.05 | 0.0615 | 2.91E−11 | 4.32E−05 | 2.2E−06 | 0.0509 |
| 500 | 1E−14 | 0.000012 | 0.05 | 2.49 | 2.91E−11 | 4.32E−05 | 0.000012 | 0.278 |
| 200 | 1E−14 | 5.5E−07 | 0.05 | 0.107 | 1.17E−11 | 2.73E−05 | 2.2E−06 | 0.0805 |
| 500 | 1E−14 | 0.000012 | 0.05 | 2.49 | 2.91E−11 | 4.32E−05 | 0.000012 | 0.278 |
| 200 | 1E−14 | 5.5E−07 | 0.079365 | 0.107 | 9.99E−12 | 2.53E−05 | 2.2E−06 | 0.087 |
| 500 | 1E−13 | 5.5E−07 | 0.05 | 0.0154 | 2.91E−10 | 0.000137 | 2.2E−06 | 0.0161 |
| 500 | 1E−13 | 0.000012 | 0.05 | 0.624 | 2.91E−10 | 0.000137 | 0.000012 | 0.0879 |
| 200 | 1E−13 | 5.5E−07 | 0.05 | 0.0268 | 1.17E−10 | 8.64E−05 | 2.2E−06 | 0.0255 |
| 500 | 1E−13 | 0.000012 | 0.05 | 0.624 | 2.91E−10 | 0.000137 | 0.000012 | 0.0879 |
| 200 | 1E−13 | 5.5E−07 | 0.079365 | 0.0268 | 9.99E−11 | 0.00008 | 2.2E−06 | 2.75E−02 |

This analysis showed that for low turbulence $$\left(1\times10^{-13}m^{-\frac{2}{3}}\right)$$

over short ranges such as 200 m, a larger focal length on the order of 200 mm will be most effective. However, for longer ranges and strong turbulence this decreases significantly. It was also found that the infrared band produces the same shift levels but may require a longer focal length due to the larger pixel size.

Figure 9:
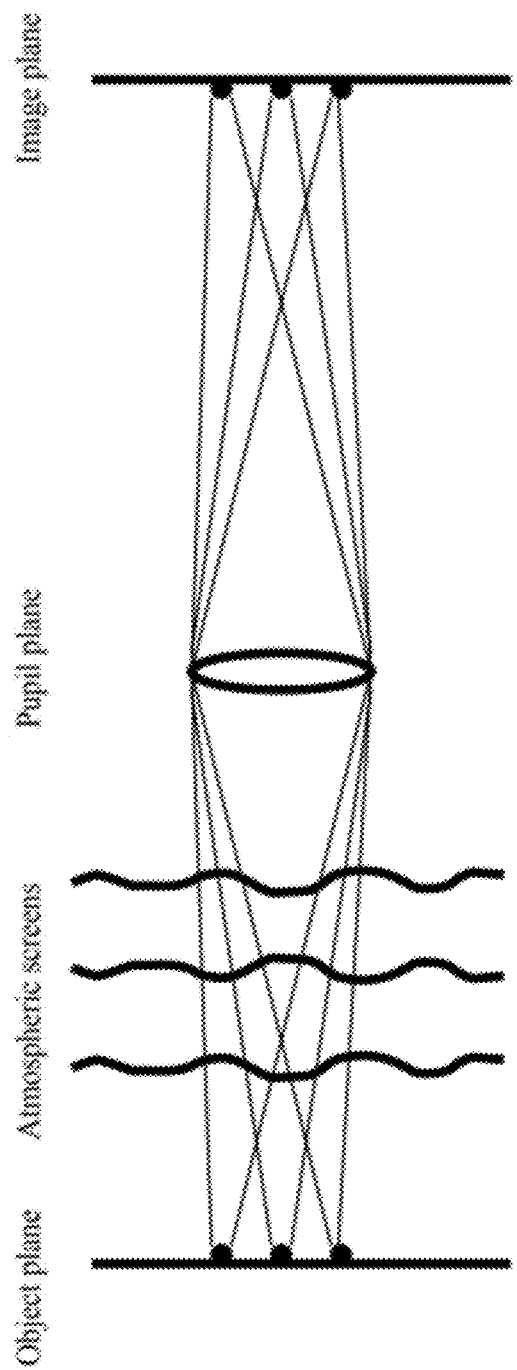
FIG. 9 shows an example anisoplanatic setup for an example simulation.

One set of simulations were performed using an anisoplanatic simulator. Anisoplanatism refers to the fact that different points in space propagate through different turbulence, resulting in a spatially variant point spread function. Horizontal and slant path imaging often results in propagation through anisoplanatic turbulence, while vertical propagation paths such as in astronomy applications can often be considered isoplanatic. Conventional turbulence simulators, such as those developed for astronomy simulations, place a screen of random phase directly on the imaging aperture, this results in all points on the image experiencing the same turbulence. Multiple phase screens distributed throughout the imaging path produce a more physically accurate simulation for horizontal and slant path scenarios. In these simulations, the method of T. A. Underwood and D. G. Voelz, "Wave optics approach for incoherent imaging simulation through distributed turbulence," in Unconventional Imaging and Wavefront Sensing 2013, vol. 8877, p. 88770G-1-88770G-8, Sep. 17, 2013, which is incorporated herein by reference in its entirety, was used, where the average of several coherent propagations of random phase realizations were averaged to produce an accurate incoherent image propagation through distributed volume turbulence. Each phase screen was assigned a value of coherence diameter r0 using the method of J. D. Schmidt, Numerical Simulation of Optical Wave Propagation with Examples in MATLAB, Bellingham, Wash: SPIE, 2010, ISBN-13: 978-0819483263, ISBN-10: 0819483265, which is incorporated by reference herein in its entirety. FIG. 9 shows an example anisoplanatic setup for this simulation.

To produce temporally correlated turbulence to accurately model the wind effects on turbulent imagery, these turbulence phase screens were translated across the imaging path. Normally, this would require generation of very large phase screens. However, in this simulation, "infinite" phase screens, as described in D. L. Fried and T. Clark, "Extruding Kolmogorov-type phase screen ribbons," J. Opt. Soc. Am. A, vol. 25, no. 2, p. 463-468, February 2008, which is incorporated by reference herein in its entirety, were used to accomplish this translation without overly taxing the system memory. For each image frame the screens were translated by $$\left\lceil \frac{V}{fps*dx} \right\rceil$$

pixels, where V is the wind speed, fps is the number of frames per second being measured, and dx is the spatial sampling of the phase screen.

Data sets for 2.8 m/s, 5.6 m/s, 10.5 m/s, and 15.4 m/s were simulated. The calculated results closely matched the indicated wind speed by the turbulence simulator, especially considering potential numerical rounding within the simulator code. Some of these results are shown in FIG. 4C. Further robustness can be achieved by aggregating wind measurement over time. It should be noted that the shift power spectrums tend to exhibit two qualities that may affect fitting. First, at the higher frequencies (over 100 Hz), the power spectrum levels off, which may skew estimates higher than desired. A solution to this would be to remove this tail of this power spectrum curve since data in this region is likely the result of noise or other imaging limits that affect tilt estimation. A second characteristic, often found at higher wind speeds, data sets with low frame rates relative to the wind speed, and data sets with very high fields of view (where pixel shifts are very small), is an upper bound to the correlation strength (i.e. power spectrum magnitude), which manifests as dips or plateaus in the observed tilt curve. This characteristic may have a tendency to skew wind speed measurement lower. To address this, fitting procedures can be adjusted to consider these limits, or modeling these expected limits can also be performed.

Specifically in relation to the experimentation show in FIG. 4C, the following results were observed. For the 2.8 m/s data set, a wind speed of 3.0 m/s was determined. The long tail on the power spectrum likely skewed this estimate higher. For the 5.6 m/s data set, a wind speed of 5.25 m/s was determined. Like the 2.8 m/s data set, the long tail on the power spectrum likely skewed this estimate higher; however, the extended dip in the low frequency power spectrum points likely counteracted some of the upward skew. The 5.6 m/s data set was also evaluated with the DIS optical flow technique and obtained similar results, showing, for example, that components such as optical flow can be run with reduced accuracy to lower computational requirements, and therefore reduce the necessary processing hardware required for real-time operation. For the 10.5 m/s data set, a wind speed of 10 m/s was determined. While the tail of the power spectrum may have skewed the estimate slightly higher, the low correlations in the low frequencies likely skewed this estimate lower. Nonetheless, the primary downward portion of this curve closely tracks the correct wind speed's model. Finally, for the 15.4 m/s data set, a wind speed of 16.25 m/s was determined. As with other tests, the primary downward portion of this curve closely tracks the correct wind speed's model. As discussed above in connection with FIG. 2, to determine the closest match between an actual power spectrum and a set of model power spectrums, in some embodiments, only a portion of the power spectrums can be compared. So in the case of these experimental results, a primary downward portion can be compared to determine the closest match.

In addition to simulation results, actual tests using real wind were performed as well. For example, a first test dataset was taken with winds approximately 5 mph to the northeast, and a camera was viewing a target 787 meters away to the south-southeast. As the viewing angle was not perfectly orthogonal to the expected wind direction, a full 5 mph estimation was not expected. A second dataset was taken with a wide field-of-view imagery of targets in a desert environment. The scene used includes a moving target traveling in a circle at approximately 1 km. For this data set, provided wind information indicated a crosswind speed of approximately 2.17 m/s. A third dataset was video of a target at 178 m, with a wind blowing southeast at approximately 2 mph, and with the target being viewed at a similar angle. As such, a low crosswind estimation was expected.

Figure 10A:
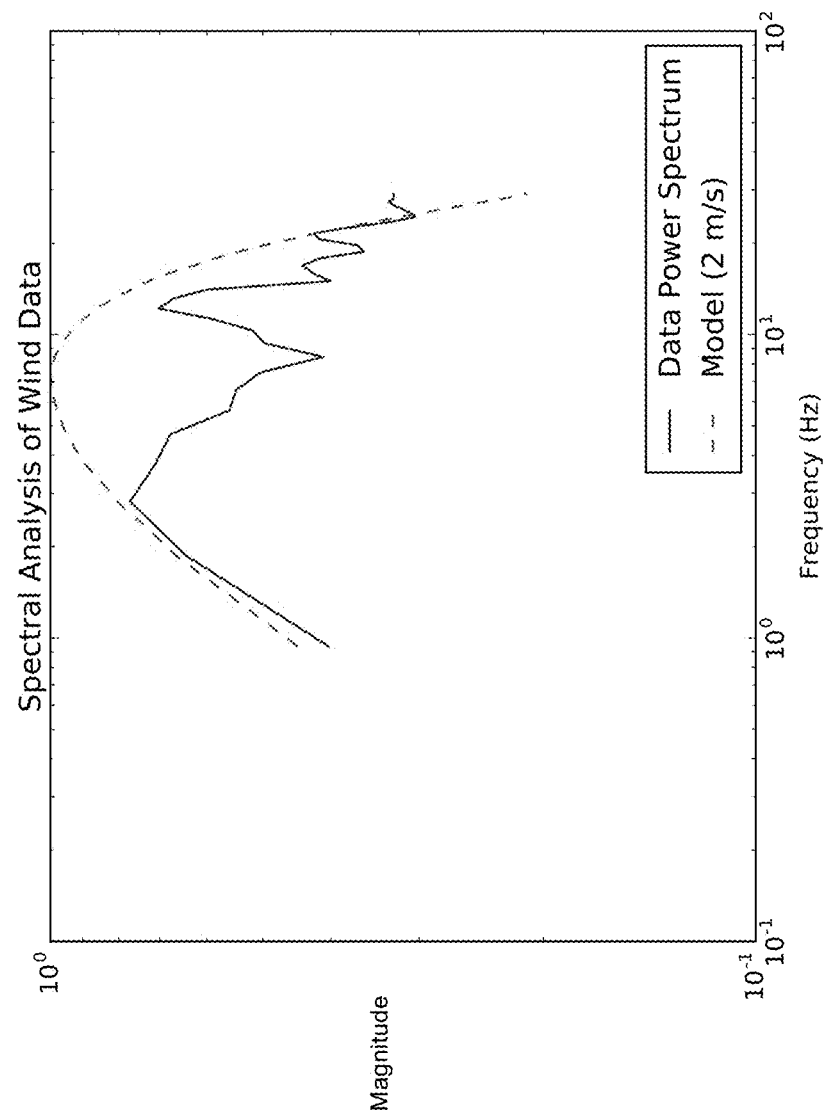
FIGS. 10A-10C show experimental results for tested wind speeds, based on actual outdoor conditions, according to some embodiments.
Figure 10B:
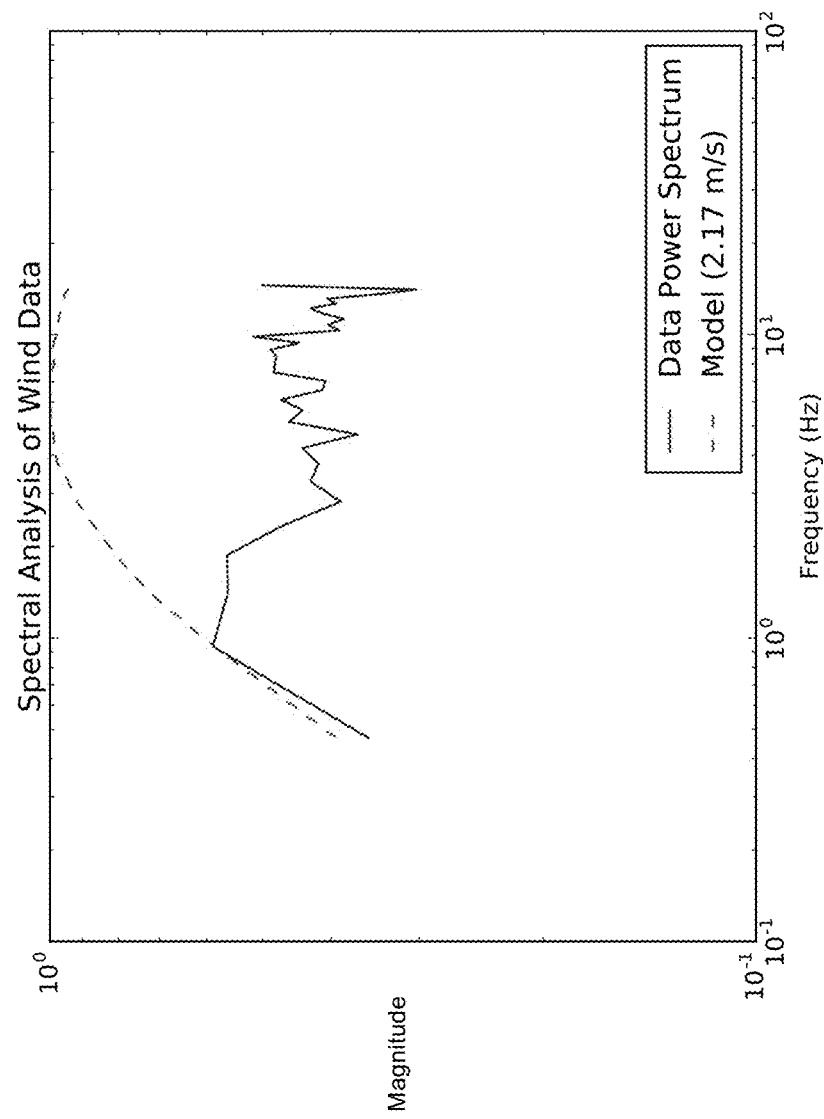
Figure 10C:
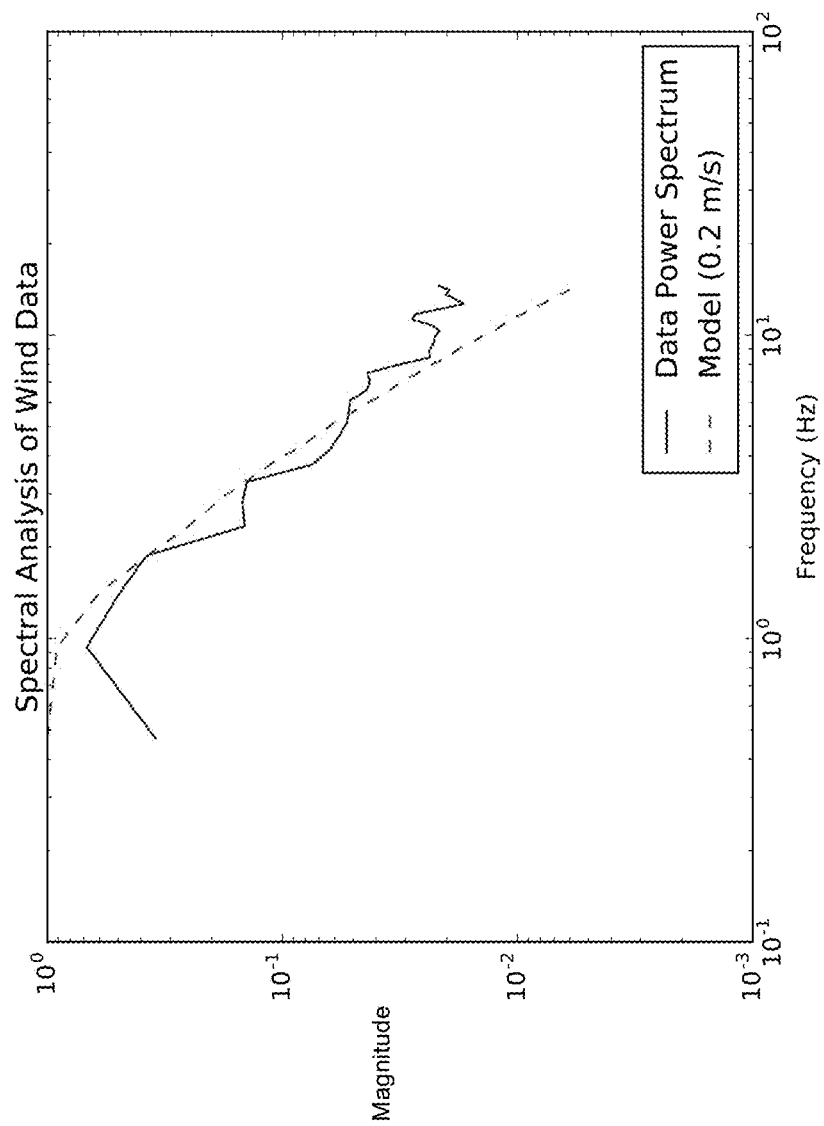

The power spectrum comparison results for these three test are shown in FIGS. 10A-10C. For the first data set, results are shown in FIG. 10A. The observed tilt roughly matched the 2 m/s model, indicating a crosswind speed of approximately 4.4 mph. This is expected, as the view of the target was not perfectly perpendicular to the wind at the time of capture. Directional analysis indicated a leftward (northeast) wind direction as expected. Although there is a clear plateau in the observed tilt, the alignment with the model is clear on the upward and downward trends. It should also be noted that in this data set, wind trends are not easily discernable by human perception, which indicates that this approach is robust even under imperfect observation.

For the second data set, results are shown in FIG. 10B. It was shown that a wide field of view, low frame rate, and target motion can conspire to complicate estimation. Much like the first dataset, there is a clear plateau in power spectrum magnitude. There is, however, a good fit to the 2.17 m/s model in the lower frequencies. A slightly higher focal length and capture frame rate would further improve the ability to match under these conditions.

For the third data set, results are shown in FIG. 10C. This data set indicates a very low wind speed, with a rightward direction. This is expected, as very little crosswind occurred at the time due to the wind direction relative to our observation path. This validates the tested approach at very low wind speeds.

Though various examples are described in connection with the above description, this description is not intended to be limiting. Rather, the scope of the invention should be determined based on the following claims.

The invention claimed is:

1. A method of determining wind speed, comprising:
   storing in a database wind speed entries for a plurality of wind speed models, the database including, for each wind speed model, a wind speed, a first set of values for a corresponding first set of parameters associated with the stored wind speed, and a corresponding mathematical representation of image shift temporal behavior associated with the stored wind speed;
   receiving a video and a second set of values for a corresponding second set of parameters for the video, the second set of parameters being the same set of parameters as the first set of parameters;
   analyzing the video to determine a mathematical representation of image shift temporal behavior for the video;
   searching the database to find a group of wind speed models that have parameter values that match or most closely match the second set of values;
   for the group of wind speed models, determining a most closely matched wind speed model by determining which wind speed model has a mathematical representation of image shift temporal behavior that most closely matches the mathematical representation of image shift temporal behavior of the video; and
   selecting the wind speed of the most closely matched wind speed model as the wind speed of the video.

2. The method of claim 1, wherein analyzing the video to determine a mathematical representation of image shift temporal behavior for the video is performed without prior knowledge of the video scene or background and without the use of a particular object in the video as a reference object.

3. The method of claim 1, wherein the mathematical representation of image shift temporal behavior for each wind speed model is a power spectrum, and the mathematical representation of image shift temporal behavior for the video is a power spectrum.

4. The method of claim 3, wherein the power spectrum of the video is an average power spectrum.

5. The method of claim 4, wherein the average power spectrum is an average of power spectrums for a plurality of cells of the video.

6. The method of claim 3, wherein the power spectrum for the video is determined based on a frequency domain representation of optical flows for the video.

7. The method of claim 1, wherein analyzing the video includes determining an optical flow for each frame of the video compared to a reference frame for the video to result in a plurality of optical flows, and using the plurality of optical flows to determine the mathematical representation of image shift temporal behavior for the video.

8. The method of claim 1, wherein receiving the video includes capturing the video in real-time by a digital camera.

9. The method of claim 8, wherein the digital camera is in communication with a computer program product that includes computer program code for performing the steps of claim 1.

10. The method of claim 9, wherein the computer program product is used to control aiming of a ballistic projectile dispenser according to the selected wind speed.

11. The method of claim 1, wherein analyzing the video to determine a mathematical representation of image shift temporal behavior for the video includes one or more of:
    computing the difference of shifts between pairs of points and fitting the result to a model for a power spectrum of differential tilt;
    pre-segmenting moving objects out of the video; and
    using a local window rather than the entire image, where the local window is restricted to a region where shifts are most likely to be caused by atmospheric turbulence.

12. The method of claim 11, wherein:
    determining the most closely matched wind speed model includes avoiding measuring shifts in regions that include the pre-segmented moving objects, or
    pre-segmenting the moving objects out of the video includes avoiding measuring image shifts in regions that include the pre-segmented moving objects.

13. The method of claim 1, wherein analyzing the video to determine a mathematical representation of image shift temporal behavior for the video includes one or more of:
    removing linear trends in the video;
    determining image shifts in at least two different directions; or
    removing image shifts greater than a threshold magnitude.

14. An apparatus for determining wind speed, the apparatus comprising:
    an image capture device including an image sensor and configured to capture a video of a scene;
    a memory configured to store the captured video;
    a computer-readable medium having a computer program product stored thereon, the computer program product configured to determine a wind speed in the scene based on analysis of atmospheric turbulence occurring in the video; and
    a storage device configured to store wind speed models,
    wherein the wind speed is determined based on an analysis of disturbances of the atmospheric turbulence occurring in the video, the disturbances due to wind,
    wherein the computer program product is configured to determine the wind speed in the scene by selecting a wind speed associated with a wind speed model that most closely matches with the disturbances of the atmospheric turbulence occurring in the video, and
    wherein the computer program product is configured to determine the wind speed in the scene by comparing a stored set of parameter values and a stored distance associated with the wind speed model that most closely matches with the disturbances of the atmospheric turbulence occurring in the video to a set of parameter values and a distance associated with the video.

15. The apparatus of claim 14, wherein:
the computer program product is configured to determine a mathematical representation of image shift temporal behavior for the scene and compare it to a mathematical representation of image shift temporal behavior for the wind speed model to select the wind speed.

16. The apparatus of claim 14, wherein:
the wind speed models each include a wind speed associated with a modeled mathematical representation of image shift temporal behavior;
the analysis of disturbances of the atmospheric turbulence occurring in the video includes a resulting mathematical representation of image shift temporal behavior in the video; and
the computer program product is configured to determine the wind speed in the scene by comparing the modeled mathematical representations of image shift temporal behavior to the resulting mathematical representation of wind shift amounts.

17. The apparatus of claim 14, further comprising:
a ballistic projectile dispenser; and
a controller connected to the ballistic projectile dispenser and in communication with the computer program product,
wherein the controller is configured to control or to indicate an aiming direction of the ballistic projectile dispenser based on the determined wind speed and based on a wind direction also determined by the computer program product.

18. The apparatus of claim 14, wherein the computer program product is configured to:
select only a portion of data from the image sensor in order to determine the wind speed; and
the image capture device is configured to increase a frame rate for capturing video so that the increased frame rate is used to capture the portion of the data that is selected.

19. A computer program product stored on a non-transitory computer-readable medium, the computer program product comprising:
program code configured to:
retrieve and store a first set of mathematical representations of image shift temporal behavior associated with a stored first set of image capture device parameters having a first set of image capture device parameter values;
determine an additional mathematical representation of image shift temporal behavior associated with a received video created with the first set of image capture device parameter values; and
determine a wind speed by comparing the additional mathematical representation of image shift temporal behavior to a subset of mathematical representations of image shift temporal behavior from the first set of mathematical representations of image shift temporal behavior, the subset selected based on the first set of image capture device parameter values.

20. The computer program product of claim 19, further comprising:
program code configured to determine the additional mathematical representation of image shift temporal behavior by:
comparing a reference frame to each frame of a sequence of video frames;
for each comparison, determining a set of optical flows corresponding to a set of cells of the frame compared to the reference frame; and
determining the additional mathematical representation of image shift temporal behavior based on the plurality of comparisons, wherein the additional mathematical representation of image shift temporal behavior is a power spectrum.

21. The computer program product of claim 19, further comprising:
program code configured to communicate the determined wind speed with a controller that controls or indicates an aiming direction of a ballistic projectile dispenser.

22. The computer program product of claim 19, wherein determining the additional mathematical representation of image shift temporal behavior associated with the received video occurs without prior knowledge of the video scene or background and without the use of a particular object in the video as a reference object.

* * * * *